US012020017B2

(12) United States Patent
Subramaniam et al.

(10) Patent No.: US 12,020,017 B2
(45) Date of Patent: Jun. 25, 2024

(54) METHOD AND ELECTRONIC DEVICE FOR SCHEDULING SOFTWARE UPGRADE OF NETWORK DEVICES

(71) Applicant: Samsung Electronics Co., Ltd., Suwon-si (KR)

(72) Inventors: Karthikeyan Subramaniam, Bangalore (IN); Saritha Ramesh Thangaraju, Bangalore (IN); Senthilkumar S, Bangalore (IN); Taewoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 17/856,330

(22) Filed: Jul. 1, 2022

(65) Prior Publication Data

US 2023/0008692 A1 Jan. 12, 2023

Related U.S. Application Data

(63) Continuation of application No. PCT/KR2022/009286, filed on Jun. 29, 2022.

(30) Foreign Application Priority Data

Jul. 5, 2021 (IN) .............................. 202141030051
May 28, 2022 (IN) .............................. 2021 41030051

(51) Int. Cl.
*H04L 47/83* (2022.01)
*G06F 8/65* (2018.01)
(Continued)

(52) U.S. Cl.
CPC ................ *G06F 8/65* (2013.01); *H04L 45/38* (2013.01); *H04L 45/70* (2013.01); *H04L 67/34* (2013.01)

(58) Field of Classification Search
CPC . G06F 8/65; H04L 45/38; H04L 45/70; H04L 67/34; H04L 41/0896;
(Continued)

(56) References Cited

U.S. PATENT DOCUMENTS 8,677,343 B2   3/2014  Averbuch et al.
8,881,132 B2  11/2014  Mopur et al.
(Continued)

FOREIGN PATENT DOCUMENTS

KR  10-2017-0084636 A  7/2017

OTHER PUBLICATIONS

Hezaveh et al., On Priority-Based Scheduling for Network Updates in SDN, 4 pages (Year: 2023).*
(Continued)

*Primary Examiner* — Thuy Dao
(74) *Attorney, Agent, or Firm* — Jefferson IP Law, LLP

(57) ABSTRACT

A method and an electronic device for scheduling software upgrade of network devices in an internet protocol (IP) based network are provided. The method includes predicting traffic directed towards at least one of the network devices, predicting at least one event to be occurred at the at least one of the network devices, determining a time period to schedule the software upgrade based on the predicted traffic and the determined at least one event, and scheduling the software upgrade in the time period.

20 Claims, 21 Drawing Sheets

(51) Int. Cl.
  *G06F 9/445* (2018.01)
  *G06F 9/455* (2018.01)
  *G06F 16/951* (2019.01)
  *H04L 12/28* (2006.01)
  *H04L 45/00* (2022.01)
  *H04L 67/00* (2022.01)

(58) Field of Classification Search
  CPC ... H04L 41/082; H04L 41/0895; H04L 41/40; H04L 41/147; H04L 45/02; H04L 41/0893
  See application file for complete search history.

(56) References Cited

U.S. PATENT DOCUMENTS

| | | | |
|---|---|---|---|
| 10,070,328 B2 * | 9/2018 | Anerousis | H04L 47/83 |
| 10,171,351 B2 * | 1/2019 | Ahn | H04L 47/70 |
| 10,235,157 B2 | 3/2019 | Kunisetty et al. | |
| 2016/0119255 A1 | 4/2016 | Luo et al. | |
| 2016/0277234 A1 | 9/2016 | Amulothu et al. | |
| 2018/0167277 A1 | 6/2018 | Mahimkar et al. | |
| 2020/0026505 A1 | 1/2020 | Olderdissen | |
| 2020/0310784 A1 | 10/2020 | Krishnan et al. | |
| 2020/0379748 A1 | 12/2020 | Wu | |
| 2021/0105293 A1 | 4/2021 | Zaron et al. | |

OTHER PUBLICATIONS

Indian Office Action dated Nov. 21, 2023, issued in Indian Patent Application No. 202141030051.
International Search Report dated Oct. 7, 2022, issued in International Application No. PCT/KR2022/009286.

* cited by examiner

METHOD AND ELECTRONIC DEVICE FOR SCHEDULING SOFTWARE UPGRADE OF NETWORK DEVICES

CROSS-REFERENCE TO RELATED APPLICATION(S)

This application is a continuation application, claiming priority under § 365(c), of an International application No. PCT/KR2022/009286, filed on Jun. 29, 2022, which is based on and claims the benefit of an Indian provisional patent application number 202141030051, filed on Jul. 5, 2021, in the Indian Patent Office, and of an Indian complete patent application number 202141030051, filed on May 28, 2022, in the Indian Patent Office, the disclosure of each of which is incorporated by reference herein in its entirety.

FIELD OF THE INVENTION

The disclosure relates to a method and a system for scheduling software upgrade of network devices in an internet protocol (IP) based network.

BACKGROUND

Software-defined network (SDN) enables programmatic network behaviour. The network behavior can be centrally and intelligently controlled irrespective of complex underlay network technology. As automation of network services can be done intelligently through SDN, the growth of SDN is high in networking to meet increased traffic demands. SDN comprises of many types of network configuration devices to regulate the network.

Software upgrades are provided to fix bugs in the devices and provide new features to the devices. Hence, software upgrades are inevitable. However, whenever a software upgrade is released for the devices, an operator's job is to identify the time of less traffic time for device software upgrade for seamless flow. More particularly, the operator needs to closely monitor the network to minimize the traffic loss, when software upgrade is performed. In addition, in case of a large network, such as a campus network/telecom data center, the operator overhead is huge since such networks comprise a large number of switches, which may range from 5000 to 6000 depending upon the size of the network. Hence, the operator needs to monitor these large numbers of switches to minimize the traffic loss which results in a huge overhead.

In view thereof, it is practically very difficult to monitor such huge networks and predict a time for minimum traffic to upgrade the software. Further, even though the software upgrade time is predicted, if any high priority data flows at that time unexpectedly, there will be data loss for the devices.

Hence, there is a need to provide techniques which overcome the above discussed problems related to software upgrades.

The above information is presented as background information only to assist with an understanding of the disclosure. No determination has been made, and no assertion is made, as to whether any of the above might be applicable as prior art with regard to the disclosure.

SUMMARY OF THE PRESENT DISCLOSURE

Aspects of the disclosure are to address at least the above-mentioned problems and/or disadvantages and to provide at least the advantages described below. Accordingly, an aspect of the disclosure is to provide a method and a system to schedule software upgrade of software-defined network (SDN) controlled network devices in an internet protocol (IP) based network.

Additional aspects will be set forth in part in the description which follows and, in part, will be apparent from the description, or may be learned by practice of the presented embodiments.

In accordance with an aspect of the disclosure, a method for scheduling software upgrade of network devices by an electronic device in an internet protocol (IP) based network is provided. The method may include predicting traffic directed towards at least one of the network devices. The method may include determining at least one event to be occurred at the at least one of the network devices. The method may include determining a time period to schedule the software upgrade based on the predicted traffic and the determined at least one event. The method may include scheduling the software upgrade in the time period.

In accordance with an aspect of the disclosure, an electronic device for scheduling software upgrade of network devices in an IP based network, is provided. The electronic device includes a memory and a processor coupled to the memory. The processor may be configured to predict traffic directed towards at least one of the network devices The processor may be configured to determine at least one event to be occurred at the at least one of the network devices. The processor may be configured to determine a time period to schedule the software upgrade based on the predicted traffic and the determined at least one event. The processor may be configured to schedule the software upgrade in the time period.

In accordance with an aspect of the disclosure, a non-transitory computer readable medium storing instructions for scheduling software upgrade of network devices in an IP based network, is provided. The instructions cause an electronic device, when executed by at least one processor to execute operations. The operations may include predicting traffic directed towards at least one of the network devices The operations may include determining at least one event to be occurred at the at least one of the network devices. The operations may include determining a time period to schedule the software upgrade based on the predicted traffic and the determined at least one event. The operations may include scheduling the software upgrade in the time period.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
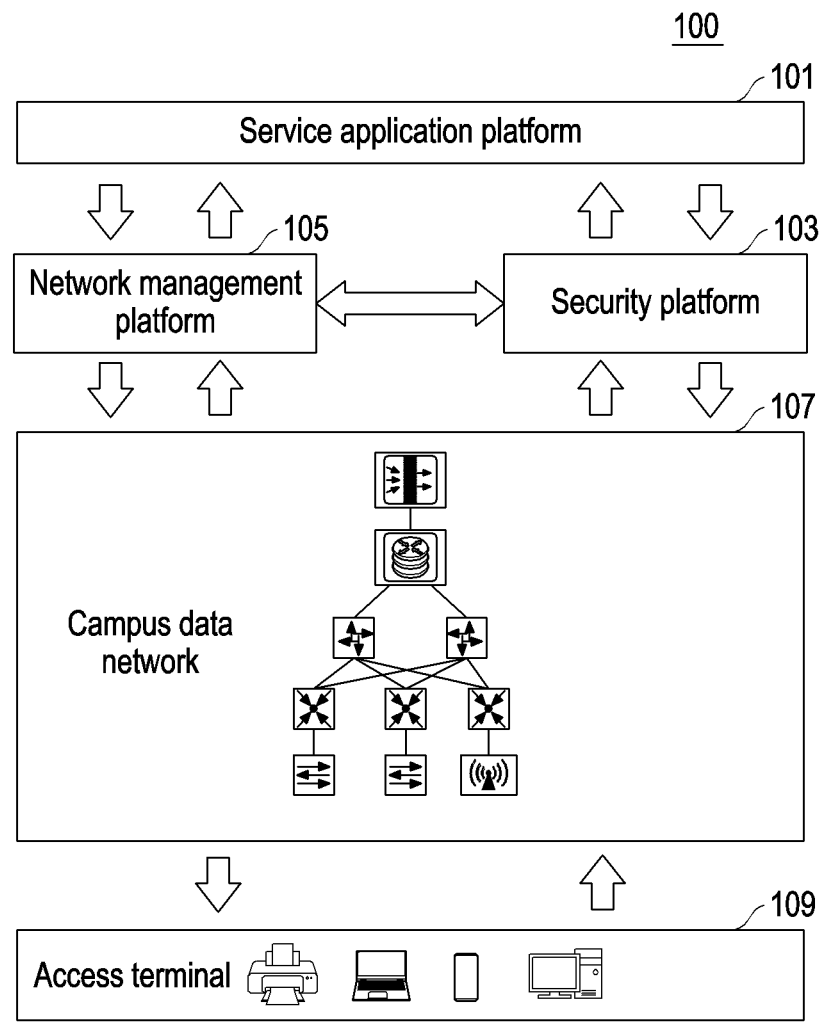
FIG. 1 illustrates a campus network model according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein, such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language, such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

The disclosure is directed towards automation of software upgrade process through artificial intelligence/machine learning (AI/ML) techniques while avoiding manual intervention during the software upgrade of devices in SDN without impacting the traffic loss.

It should be noted that the term SDN controlled network device and SDN device has been interchangeably used throughout the specification. Similarly, the term neighbor SDN controlled network device and neighbor device has been interchangeably used throughout the specification.

Embodiments of the disclosure will be described below with reference to the accompanying drawings.

The disclosure discloses techniques to schedule software upgrade of software-defined networking (SDN) controlled network devices in an internet protocol (IP) based network. In an embodiment of the disclosure, a campus network model has been considered as the internet protocol (IP) based network to describe the techniques of the disclosure. It should be noted that the campus network model is just an example of the IP based network where the disclosed techniques may be applied. The disclosed techniques may be applied to any other IP based network including, but not limited to, cellular, a local area network (LAN), or a wide area network (WAN), known to a person skilled in the art.

FIG. 1 illustrates a campus network model (100), according to an embodiment of the disclosure. A campus network or a campus area network, (CAN) is a computer network made up of an interconnection of local area networks (LANs) within a limited geographical area. The networking equipment, such as switches, routers and transmission media, such as optical fiber, copper plant, Cat5 cabling, or the like, are almost entirely owned by the campus tenant/owner an enterprise, university, government, or the like. A campus area network is larger than a local area network but smaller than a metropolitan area network (MAN) or wide area network (WAN).

Referring to FIG. 1, the model may comprise of a service application platform (101) connected to a security platform (103) and a network management platform (NMP) (105). The security platform and the NMP (105) are coupled with each other and to a campus data network (107). The campus data network (107) may be constructed using for example, but not limited to, Ethernet or a wireless local area network (WLAN) technologies. It may consist of all data communications devices on the campus network, including various Ethernet switches, wireless access points (APs), wireless access controllers (WACs), and firewalls. All internal data traffic of the devices is forwarded through the campus data network. The campus data network (107) is connected to a plurality of access terminals (109). The plurality of access terminals are considered as network consumers. The dimensions of campus networks, such as a big or a small campus network is defined by a number of terminal users and network equipment employed within the network.

Further, the NMP (105) is the foundation for service applications. It provides open north-bound and south-bound application programming interfaces through which service systems invoke network resources. The security platform (103) utilizes network-wide big data provided by the network management platform to defend against advanced persistent treats (APT). It invokes the northbound APIs provided by network management platform to isolate and automatically clean up threat traffic for APT defense. The service application platform (101) may be developed by using a base provided by the NMP. For example, using wireless fidelity (Wi-Fi) network positioning data to develop heat-map applications.

Figure 2:
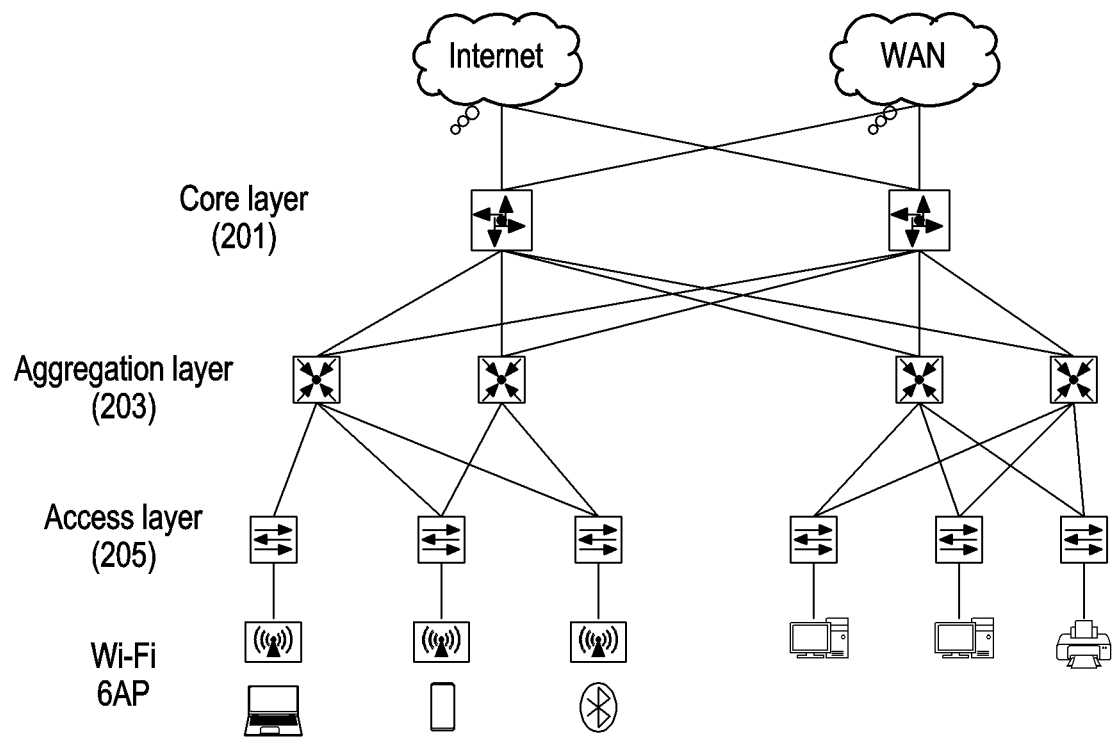
FIG. 2 illustrates three-layer networking in a campus data network according to an embodiment of the disclosure.

FIG. 2 illustrates a three-layer networking in a campus data network according to an embodiment of the disclosure.

Referring to FIG. 2, the networking architecture of the campus data network may consist of three layers, i.e., a core layer (201), an aggregation layer (203) and an access layer (205). The core layer (201) forms the backbone of the campus network. Further, the core layer (201) is responsible for data exchange between the layers and provides high-speed interconnectivity for various parts of the campus network. The core layer (201) may comprise of various core switches.

Figure 3A:
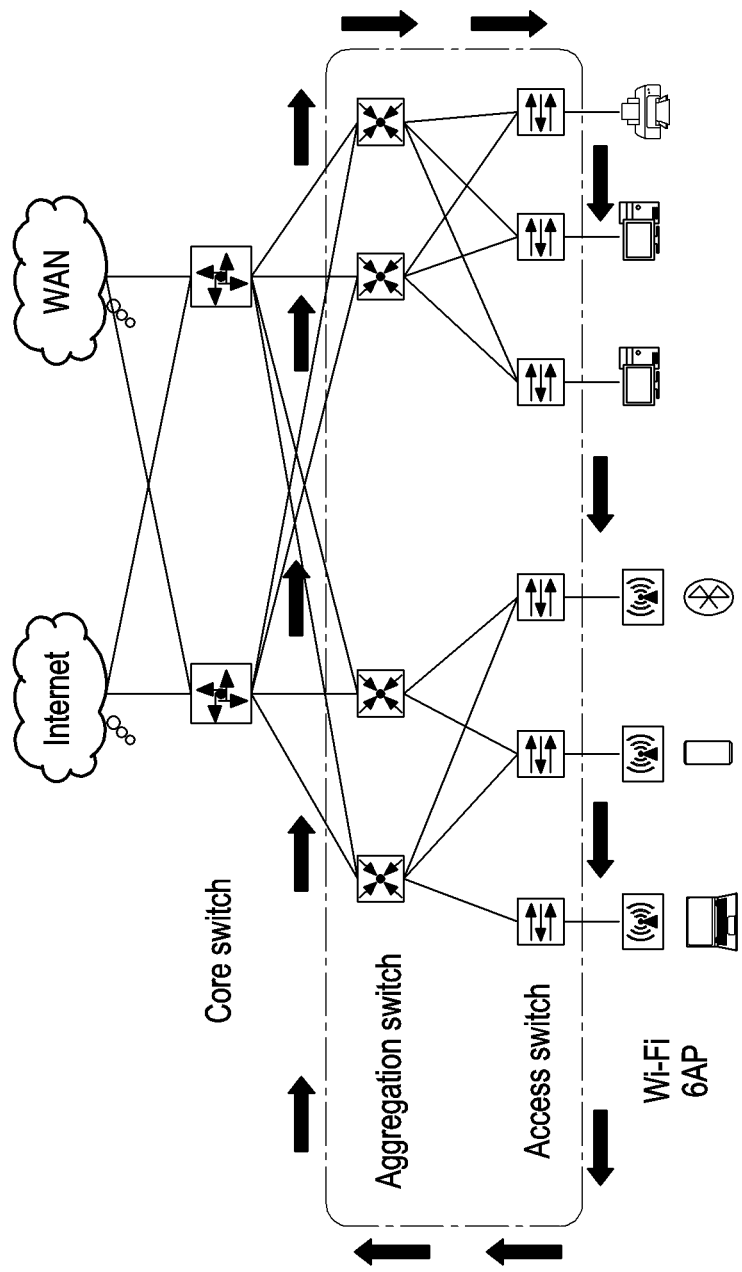
FIG. 3A illustrates east-west traffic flow in a campus data network according to an embodiment of the disclosure.

FIG. 3A illustrates east-west traffic flow in a campus data network, according to an embodiment of the disclosure.

Figure 3B:
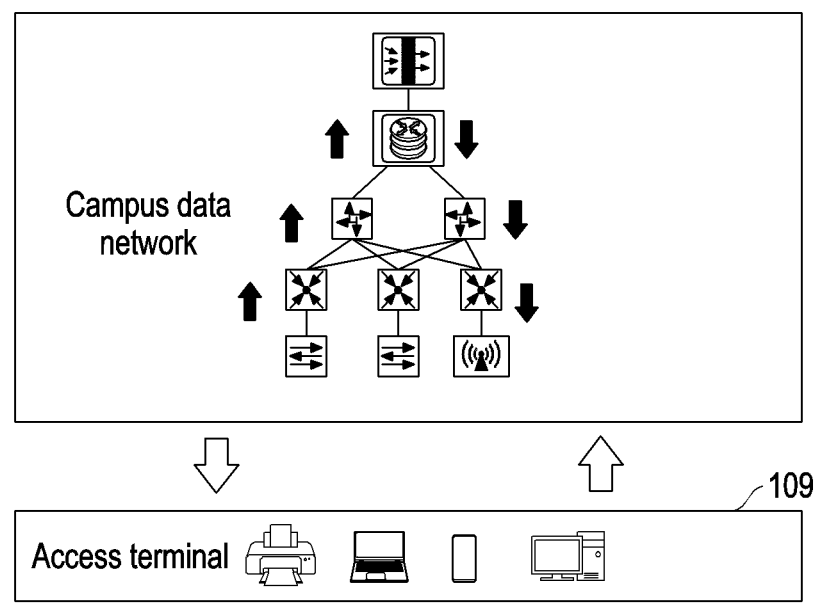
FIG. 3B illustrates north-south traffic flow in a campus data network according to an embodiment of the disclosure.

FIG. 3B illustrates north-south traffic flow in a campus data network, according to an embodiment of the disclosure.

Referring to FIG. 3A, the aggregation layer (203) connects the access layer (205) and the core layer (201). The campus network may have two type of traffic flow, i.e., east-west traffic and north-south traffic. The east-west traffic is transfer of data packets from server to server within a data center.

Referring to FIG. 3B, the term east-west for this type of traffic comes from network diagram drawings that usually depict local area network (LAN) traffic horizontally. For example, if hosts on one access switch need to quickly communicate with systems on another access switch. The north-south traffic denotes a direction of traffic flow into and out of a data center. For example, southbound traffic is data entering the data center through a firewall and/or other networking infrastructure.

Aggregation devices forward east-west traffic between users and north-south traffic to the core layer (201). The aggregation layer (203) may comprise of various aggregation switches connected to the core switches.

The access layer (205) is the first network layer to which the access terminals connect to. This layer is usually including various access switches. These access switches tend to be large in number and sparsely distributed throughout the network and are connected to the aggregation switches.

Figure 4:
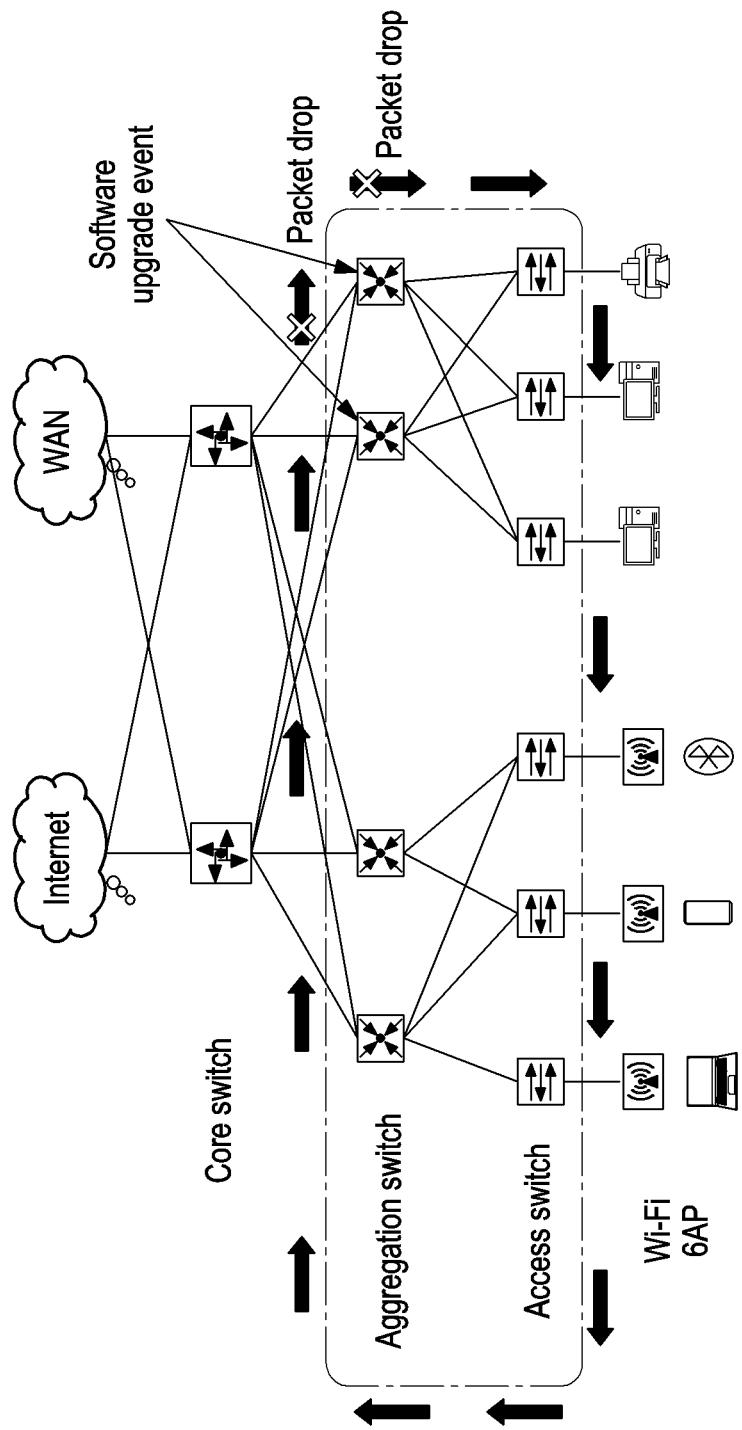
FIG. 4 illustrates loss of data in a campus data network according to the related art.

FIG. 4 illustrates loss of data in a campus data network according to the related art.

Referring to FIG. 4, however, as per existing technique, software upgrade may be initiated at any time at any of the device(s) in the campus data network. The device(s) restarts in lieu of software upgrade which may result in traffic loss. For example, if such software upgrade is initiated when there is traffic moving across the device(s), then data packets moving across the device(s) may be dropped, thus resulting in traffic loss.

Figure 5:
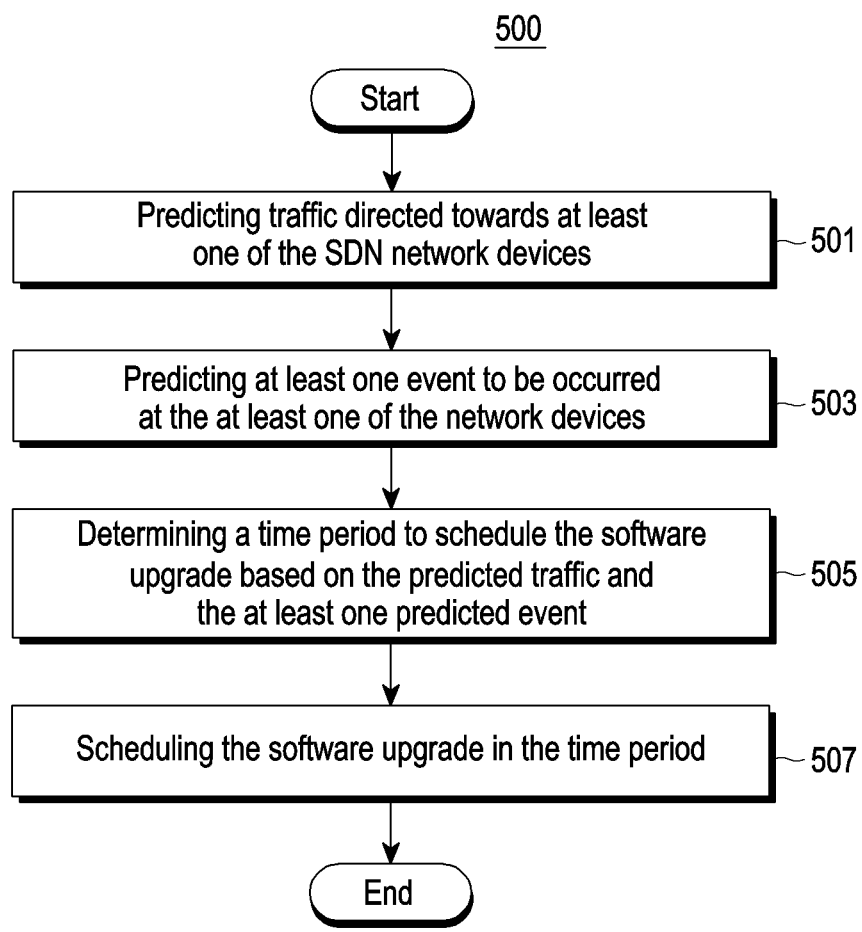
FIG. 5 illustrates a flow diagram depicting a method to schedule software upgrade of software-defined networking (SDN) controlled network devices in an internet protocol (IP) based network according to an embodiment of the disclosure.

FIG. 5 illustrates a method 500 depicting a schedule software upgrade of software-defined network (SDN) controlled network devices in an internet protocol (IP) based network according to an embodiment of the disclosure.

Figure 6A:
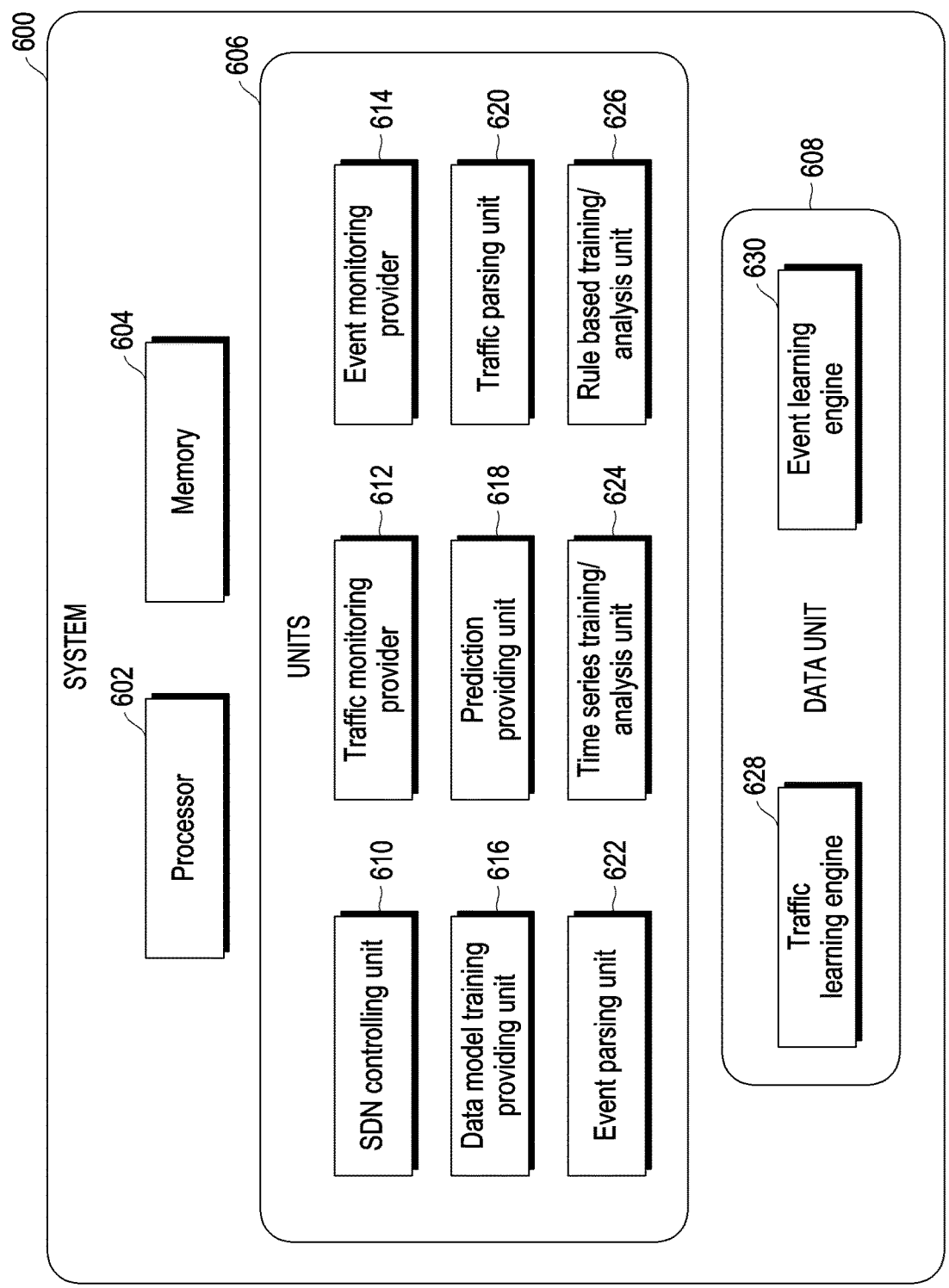
FIG. 6A illustrates a block diagram depicting a system to schedule software upgrade of SDN controlled network devices in an IP based network according to an embodiment of the disclosure.
Figure 6B:
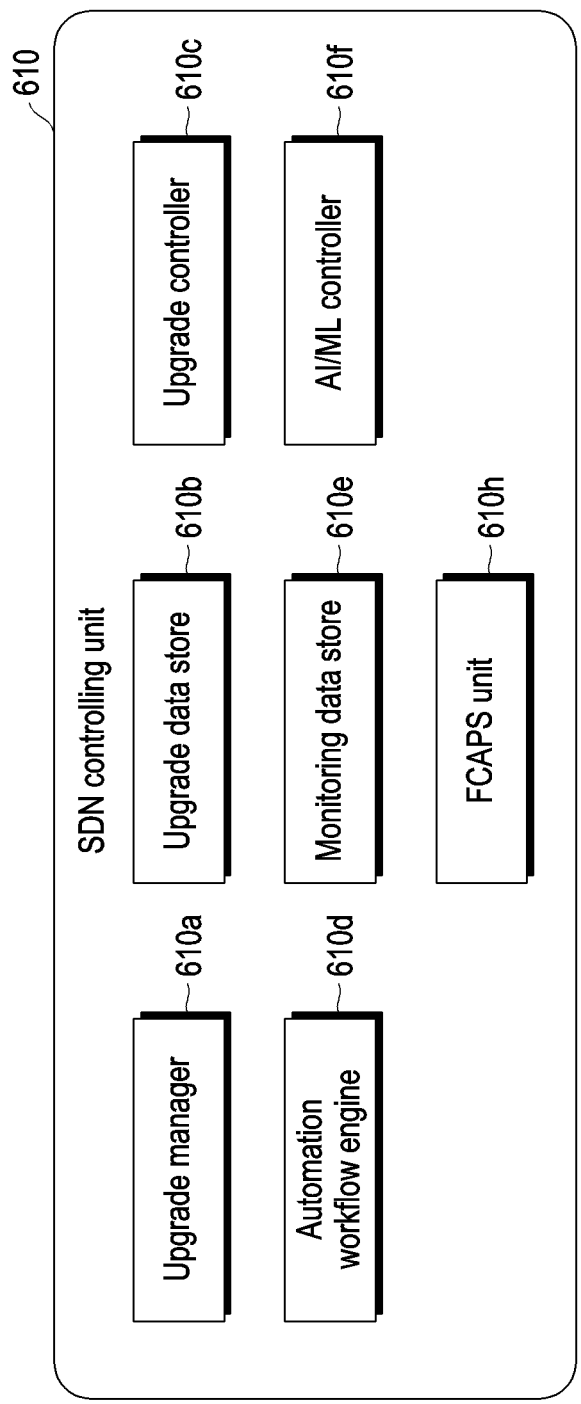
FIG. 6B illustrates a block diagram depicting a SDN controlling unit according to an embodiment of the disclosure.

FIGS. 6A and 6B illustrate a block diagram of a system 600 to schedule software upgrade of SDN controlled network devices in an internet protocol (IP) based network according to various embodiments of the disclosure.

FIG. 6A illustrates a block diagram depicting a SDN controlling unit in accordance with an embodiment of the disclosure. For the sake of brevity, the description of the FIGS. 5, 6A, and 6B are explained in conjunction with each other.

Referring to FIGS. 5, 6A, and 6B, a system 600 may include, but is not limited to, a processor 602, a memory 604, units 606, and data unit 608. The units 606 and the memory 604 may be coupled to the processor 602. The system 600 may be implemented in an electronic device such as a computing device or a server.

The processor 602 can be a single processing unit or several units, all of which could include multiple computing units. The processor 602 may be implemented as one or more microprocessors, microcomputers, microcontrollers, digital signal processors, central processing units, state machines, logic circuitries, and/or any devices that manipulate signals based on operational instructions. Among other capabilities, the processor 602 is configured to fetch and execute computer-readable instructions and data stored in the memory 604.

The memory 604 may include any non-transitory computer-readable medium known in the art including, for example, volatile memory, such as a static random access memory (SRAM) and a dynamic random access memory (DRAM), and/or a non-volatile memory, such as a read-only memory (ROM), an erasable programmable ROM, flash memories, hard disks, optical disks, and magnetic tapes.

The units 606 amongst other things, include routines, programs, objects, components, data structures, or the like, which perform particular tasks or implement data types. The units 606 may also be implemented as, signal processor(s), state machine(s), logic circuitries, and/or any other device or component that manipulate signals based on operational instructions.

Further, the units 606 can be implemented in hardware, instructions executed by a processing unit, or by a combination thereof. The processing unit can comprise a computer, a processor, such as the processor 602, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the disclosure, the units 606 may be machine-readable instructions (software) which, when executed by a processor/processing unit, perform any of the described functionalities.

In an embodiment of the disclosure, the units 606 may include a SDN controlling unit 610, a traffic monitoring provider 612, an event monitoring provider 614, a data model training providing unit 616, a prediction providing unit 618, a traffic parsing unit 620, an event parsing unit 622, a time series training/analysis unit 624, and a rule based training/analysis unit 626.

The data unit 608 may comprise a traffic learning engine 628 and an event learning engine 630. The various units 610-630 may be in communication with each other. In an embodiment of the disclosure, the various units 610-630 may be a part of the processor 602. In another embodiment of the disclosure, the processor 602 may be configured to perform the functions of units 610-630. The data unit 608 serves, amongst other things, as a repository for storing data processed, received, and generated by one or more of the units 606.

FIG. 6A illustrates a block diagram depicting a SDN controlling unit according to an embodiment of the disclosure.

Referring to FIG. 6A, the SDN controlling unit 610 may comprise of an upgrade manager 610a, an upgrade data store 610b, an upgrade controller 610c, an intent based automation workflow engine 610d, monitoring data store 610e, an AI/ML controller 610f and an upgrade fault, configuration, accounting, performance and security (FCAPS) unit 610h. The various units 610a-610h may be in communication with each other. The workflow engine 610d is a library that retrieves sequence of actions as defined in workflows. In an embodiment of the disclosure, the workflow engine 610d may process the workflows. The workflows may be identified by a unique name with meaningful description. The workflow may be used to define two components, i.e., an event data to be examined and conditional comparison values given in workflow with event data. In an embodiment of the disclosure, the event data could be a new software update available in a SDN installer. The SDN installer typically hosts all the new software packages required for creating SDN controlling unit 610a. In an embodiment of the disclosure, the conditional comparison values could be a software version checked using attribute "is equal to" with latest available software version of upgrade. The SDN controlling unit 610a deploys workflows to simplify the network configurations by automating tasks that are repetitive in nature.

Referring to FIG. 5, at operation 501, the method 500 comprises predicting traffic directed towards at least one of the SDN controlled network devices. In an embodiment of the disclosure, traffic may refer to data moving across SDN controlled network devices at any given time. It is to be noted that, in an embodiment of the disclosure, the at least one SDN controlled network device is, but not limited to, one of an access switch, an aggregation switch and a core switch. A neighbor SDN controlled network device is, but not limited to, one of an access switch and an aggregation switch. It should be noted that the above examples of SDN controlled network device and neighbor SDN controlled network device is in reference to a campus data network. However, the type of these devices may vary for different type of IP networks.

Thereafter, at operation 503, the method 500 comprises predicting at least one event to be occurred at the at least one of the network devices. In an embodiment of the disclosure, at least one event may refer to but not limited to, determination of the device's interface port bandwidth utilization, measurement of network latency, .log record sent to the SDN controlling unit 610 from each SDN device, simple network management protocol (SNMP) trap, SNMP polled old data triggering fault and event alerts from each SDN device, telemetry interface over the grpc remote procedure call (GRPC) gathering protocol specific metrics, such as border gateway protocol/intermediate system to intermediate system/open shortest path first (border gateway protocol (BGP)/intermediate system to intermediate system (ISIS)/open shortest path first (OSPF))/node control plane events, each SDN device's configuration validation from the SDN Controlling unit 610 that can be used for decision of software upgrade requirement.

Figure 7A:
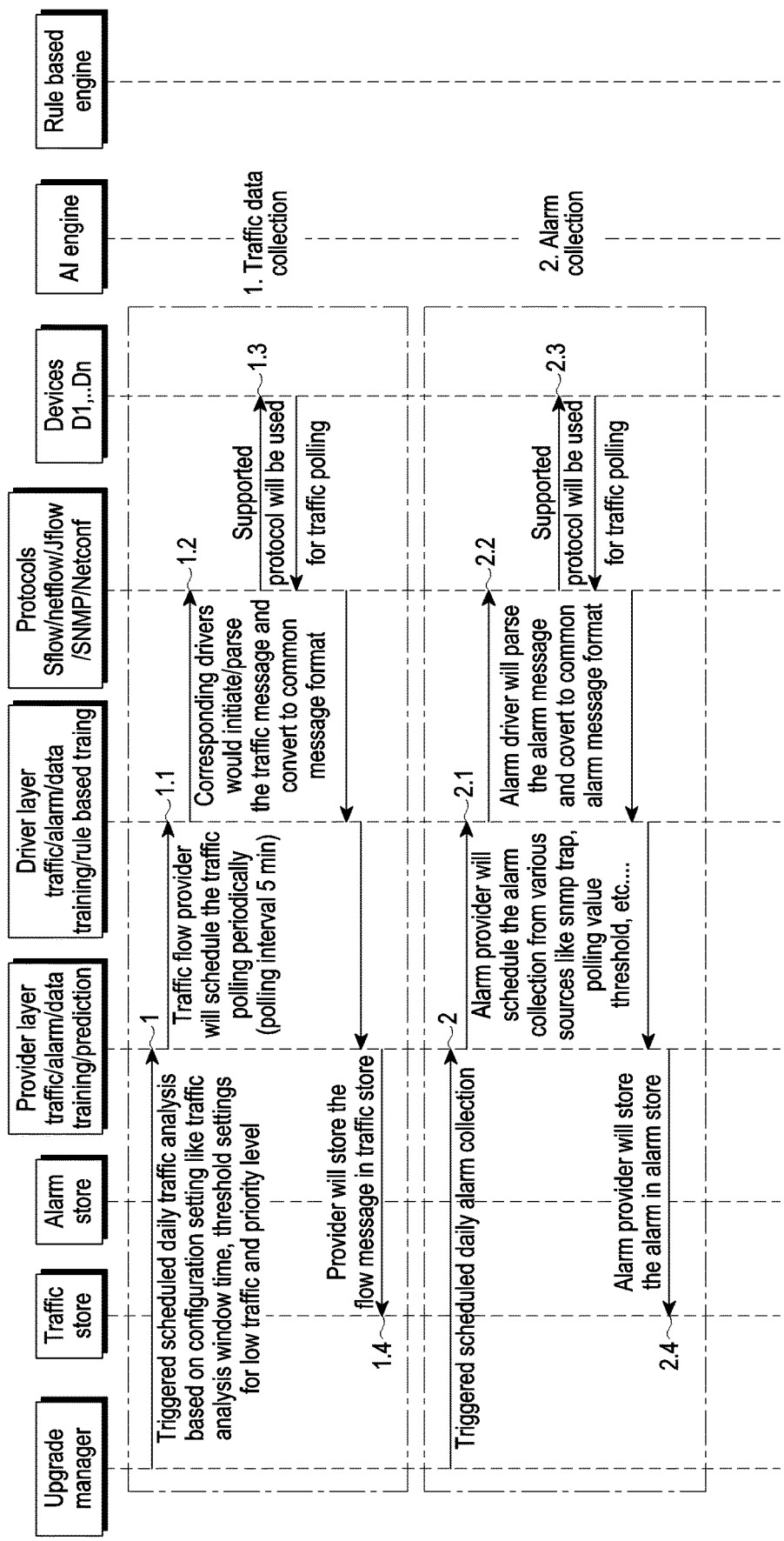
FIGS. 7A and 7B illustrates a sequence diagram to predict traffic and event at SDN device according to various embodiments of the disclosure.
Figure 7B:
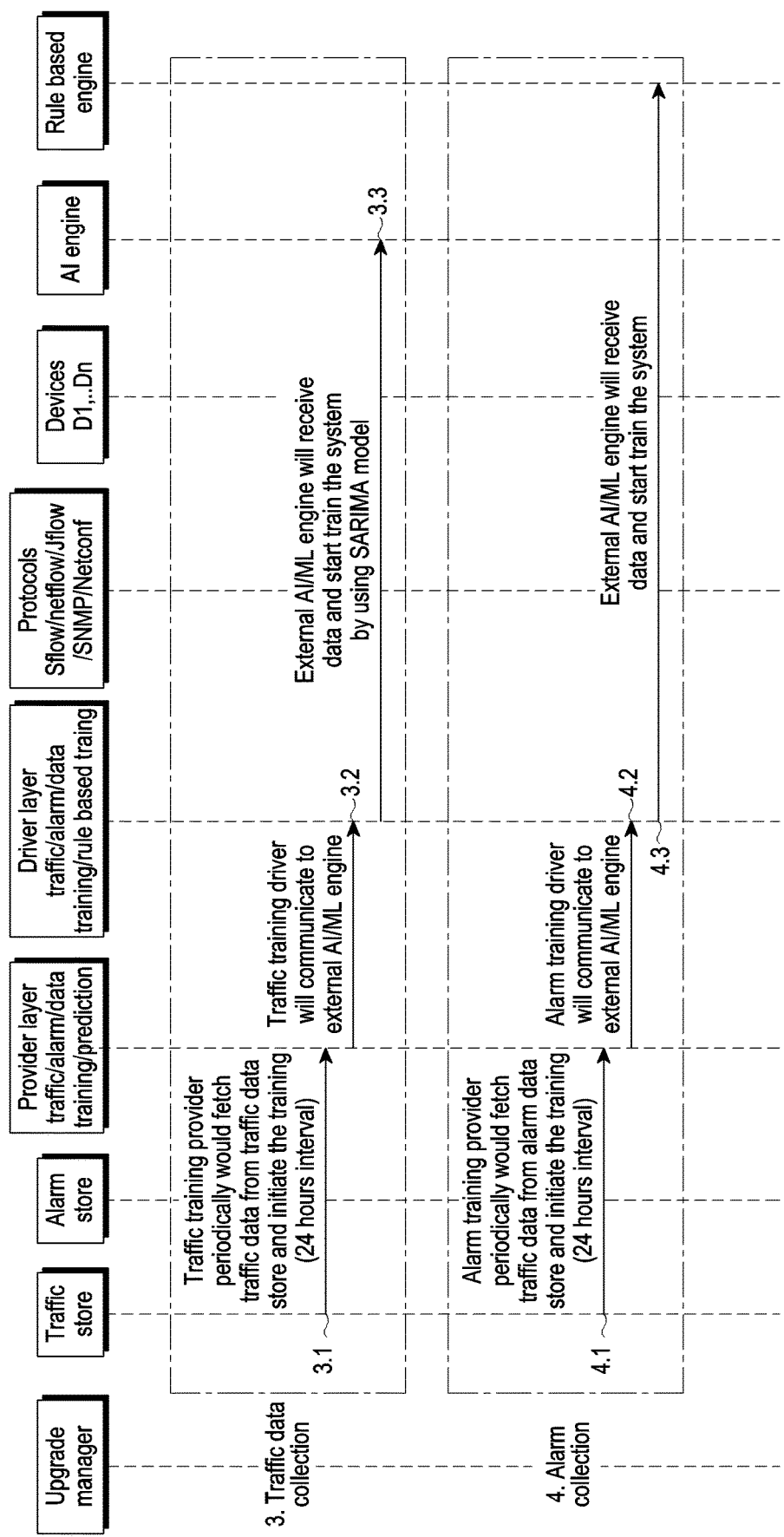

FIGS. 7A and 7B illustrate a sequence diagram to predict traffic and event at SDN device according to various embodiments of the disclosure.

In an embodiment of the disclosure, the IP based network may be the campus data network of FIG. 2. Accordingly, the SDN controlled network devices may be any of the core switch, aggregation switch and access switches. Accordingly, the traffic can be predicted at, at least one of these switches. In an embodiment of the disclosure, the traffic and the at least one event (herein referred as the event) at the at least one of the SDN controlled network devices may be predicted in accordance with FIGS. 7A and 7B.

Referring to FIGS. 7A and 7B, at operations 1-4.3, the upgrade manager 610a may trigger scheduled daily traffic analysis based on configuration settings like traffic analysis window time, threshold settings for low traffic and priority level to the traffic monitoring provider. Then, the traffic monitoring provider 612 provides the traffic data and the traffic parsing unit 620 may parse the traffic data to convert the traffic data in a common message format, i.e., an AI/ML readable message format. In other words, the traffic parsing unit 620 may convert the traffic data to a message format that it is in machine learning processable. In an embodiment of the disclosure, the traffic data may be stored in the upgrade data store 610b. After converting the traffic data, the traffic learning engine 628 is trained based on the received traffic data to predict the traffic. More particularly, a data model training providing unit 616 and a prediction providing unit 618 periodically fetch traffic data from the upgrade data store 610b and initiate the training. Thereafter, the traffic parsing unit 620 may convert the traffic data and communicate it to the traffic learning engine 628 and the traffic learning engine 628 may initiate the training to predict the traffic at the SDN device. In an embodiment of the disclosure, the traffic learning engine 628 is an AI/ML engine and may be trained using a seasonal autoregressive integrated moving average (SARIMA) model. It should be noted that the SARIMA model is just a model to train the traffic learning engine 628 and any other known to a person skilled in the art may be used to train the traffic learning engine 628.

To predict the event, as shown in FIGS. 7A and 7B, the upgrade manager 610a may trigger scheduled daily event collection. Thereafter, the event monitoring provider 614 collects the event data from various sources like, but not limited to, SNMP trap, polling value threshold, or the like, and the event parsing unit 622 may parse the event data to convert the event data in a common message format, i.e., an AI/ML readable message format. In other words, the event parsing unit 622 may convert the event data to a message format that it is in machine learning processable. In an embodiment of the disclosure, the event data may be link detected/failure events, threshold based traffic usage events, protocols, such as BGP, OSPF and ISIS neighbor/route discovery, or the like. In an embodiment of the disclosure, the event data may be stored in the upgrade data store 610*b*. After converting the event data, the event learning engine 630 is trained based on the received event data to predict the event. More particularly, a time series training/analysis unit 624 along with a rule based training/analysis unit 626 periodically fetch event data from the upgrade data store 610*b* and initiate the training. Thereafter, the event parsing unit 622 may convert the event data and communicate it to the event learning engine 630 and the event learning engine 630 may initiate the training to predict the traffic at the SDN device. In an embodiment of the disclosure, the event learning engine 630 is an AI/ML engine.

Thereafter, at operation 505, the method 500 comprises determining a time period to schedule the software upgrade based on the predicted traffic and the at least one predicted event. In an embodiment of the disclosure, the upgrade manager 610 may invoke the workflow based on the predicted traffic and the at least one predicted event to determine the time period. The determined time period may be stored in the upgrade data store 610*b*.

Thereafter, at operation 507, the method 500 comprises scheduling the software upgrade in the determined time period. More particularly, the upgrade manager 610*a* may fetch the time period from the upgrade data store 610*b* and schedule the software upgrade. Scheduling of the software upgrade is further explained below in reference to FIGS. 8, 9A, 9B, 9C, 9D, 9E, 10A, and 10B.

Figure 8:
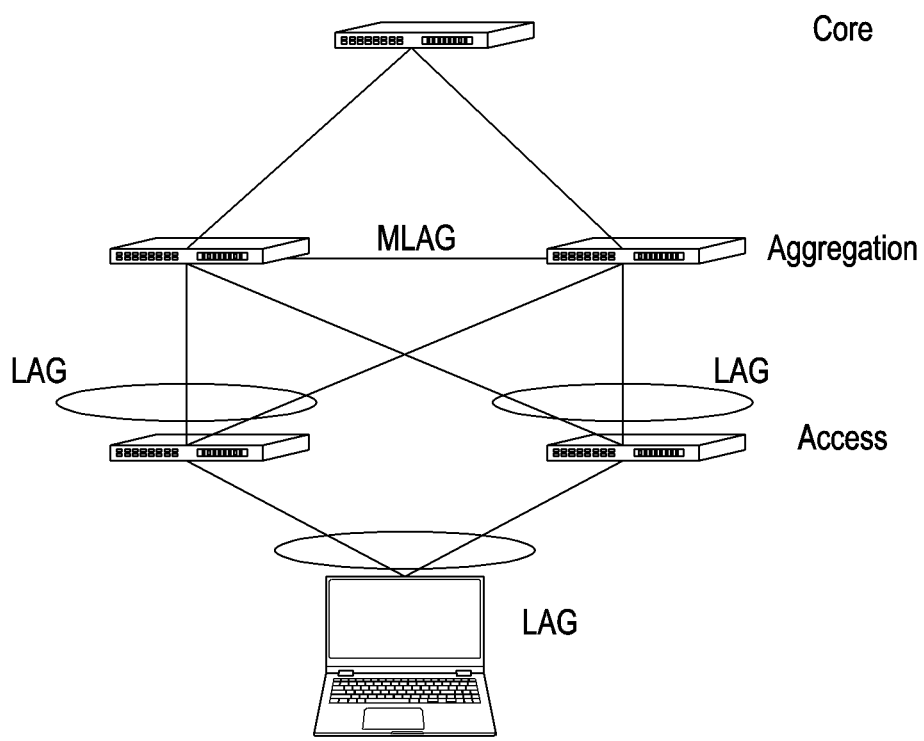
FIG. 8 illustrates a network architecture implementing scheduling of software upgrade according to an embodiment of the disclosure.

FIG. 8 illustrates a network architecture implementing scheduling of software upgrade according to an embodiment of the disclosure.

Referring to FIG. 8, the access layer provides network connectivity to end-user devices. It also provides high availability to end user traffic whereas the aggregation layer acts as a multiplexing point for the access layer. All traffic to and from the access layer flows through the aggregation layer, the aggregation layer needs to provide high availability and resiliency in the campus network. In this embodiment of the disclosure, it is determined if the predicted traffic at the least one network device is below a first threshold in the time period, then the software upgrade is scheduled in the time period. For example, in an embodiment of the disclosure, the first threshold may be configurable and may be configured by the network device provider. For example, the first threshold may be zero. In an embodiment of the disclosure, below parameters may be used to determine if the traffic is below the first threshold.

TABLE 1

| No. | Parameter Name | Description |
|---|---|---|
| 1 | Router ID | Router ID from where flow details are getting collected |
| 2 | Timestamp | The time by when this dataset was last sampled in Router ID |
| 3 | Throughput | Total bytes of incoming and outgoing packets belonging to this Router ID |

For example, whenever the throughput value for the at least one SDN controlled device is below the first threshold, then it may be considered that the traffic is below the first threshold and software upgrade may be scheduled. The router ID may be used to identify the at least one SDN controlled device and the timestamp may be used to identify the time when the traffic was determined for the at least one SDN controlled device.

FIGS. 9A, 9B, 9C, 9D, and 9E illustrate use case of scheduling software upgrade according to various embodiments of the disclosure.

Figure 9A:
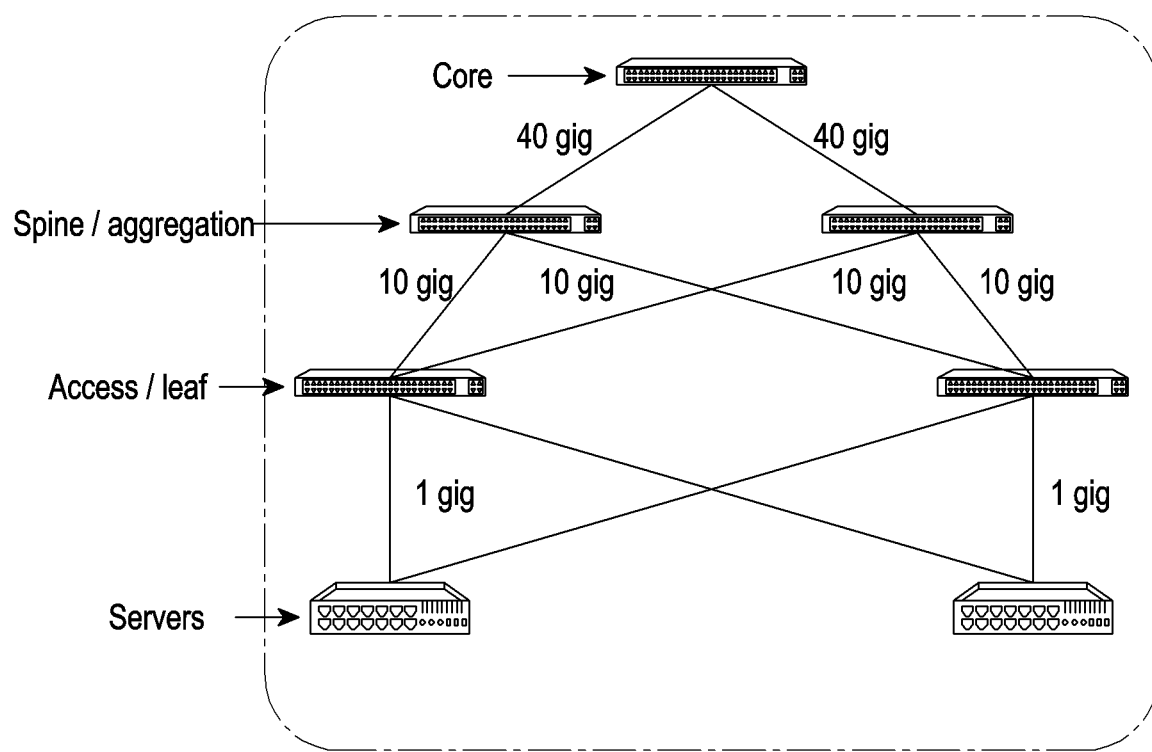
FIGS. 9A, 9B, 9C, 9D, and 9E illustrate use case of scheduling software upgrade according to various embodiments of the disclosure.

FIG. 9A illustrates a campus data network where the software upgrade is to be scheduled.

Figure 9B:
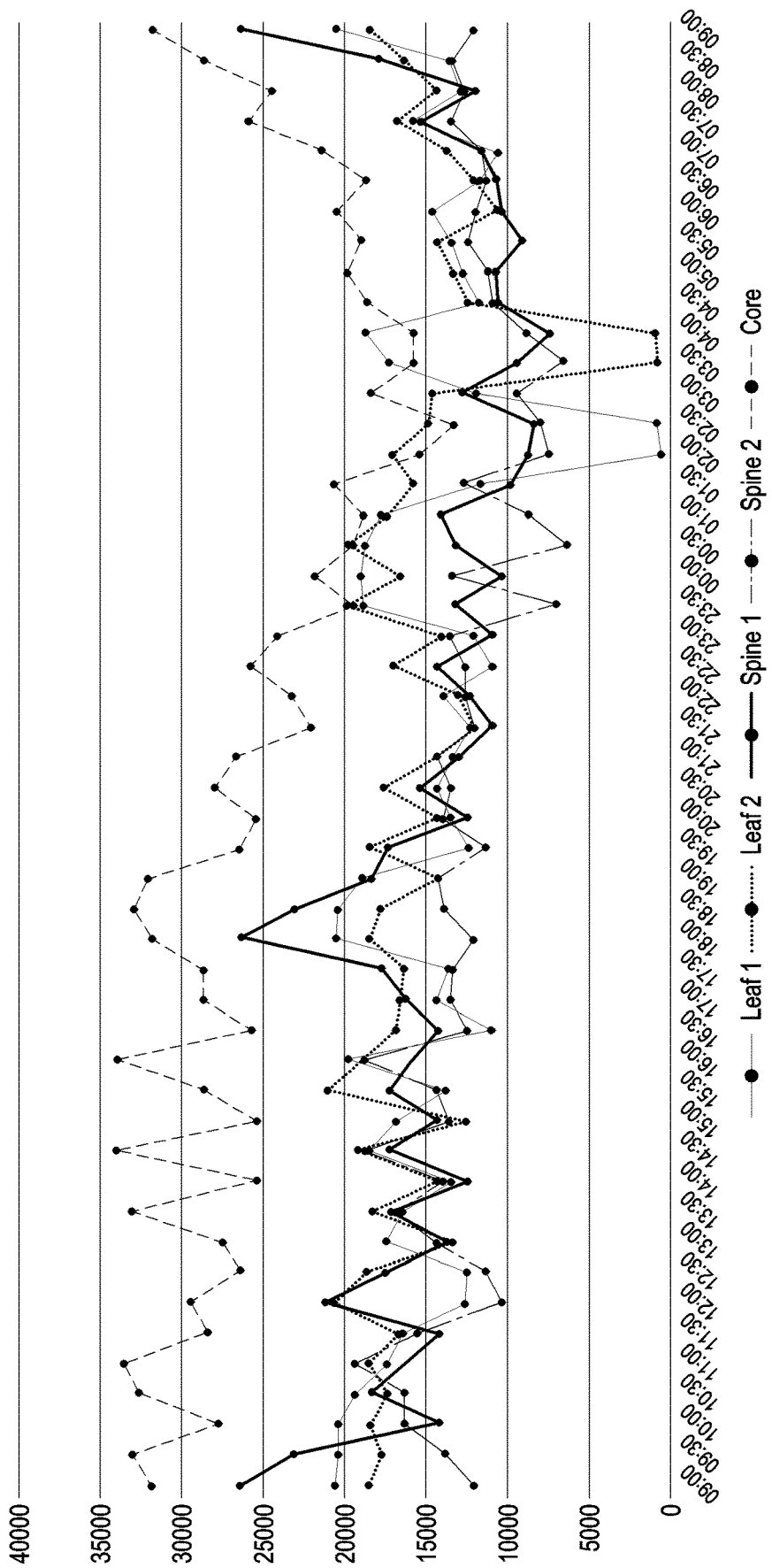

Referring to FIG. 9A, aggregation switches have been referred to as spine and access switches have been referred to as leaf More particularly, two aggregation switches have been referred as spine 1 and spine 2. Similarly, two access switches have been referred as leaf 1 and leaf 2. When the techniques as discussed in FIG. 8 are applied to campus data network of FIG. 9A, traffic in next 24 hours for core, leaf 1, leaf 2, spine 1 and spine 2 are determined, as shown in FIG. 9B. In an embodiment of the disclosure, the first threshold is taken as 1 gigabyte (GB).

Figure 9C:
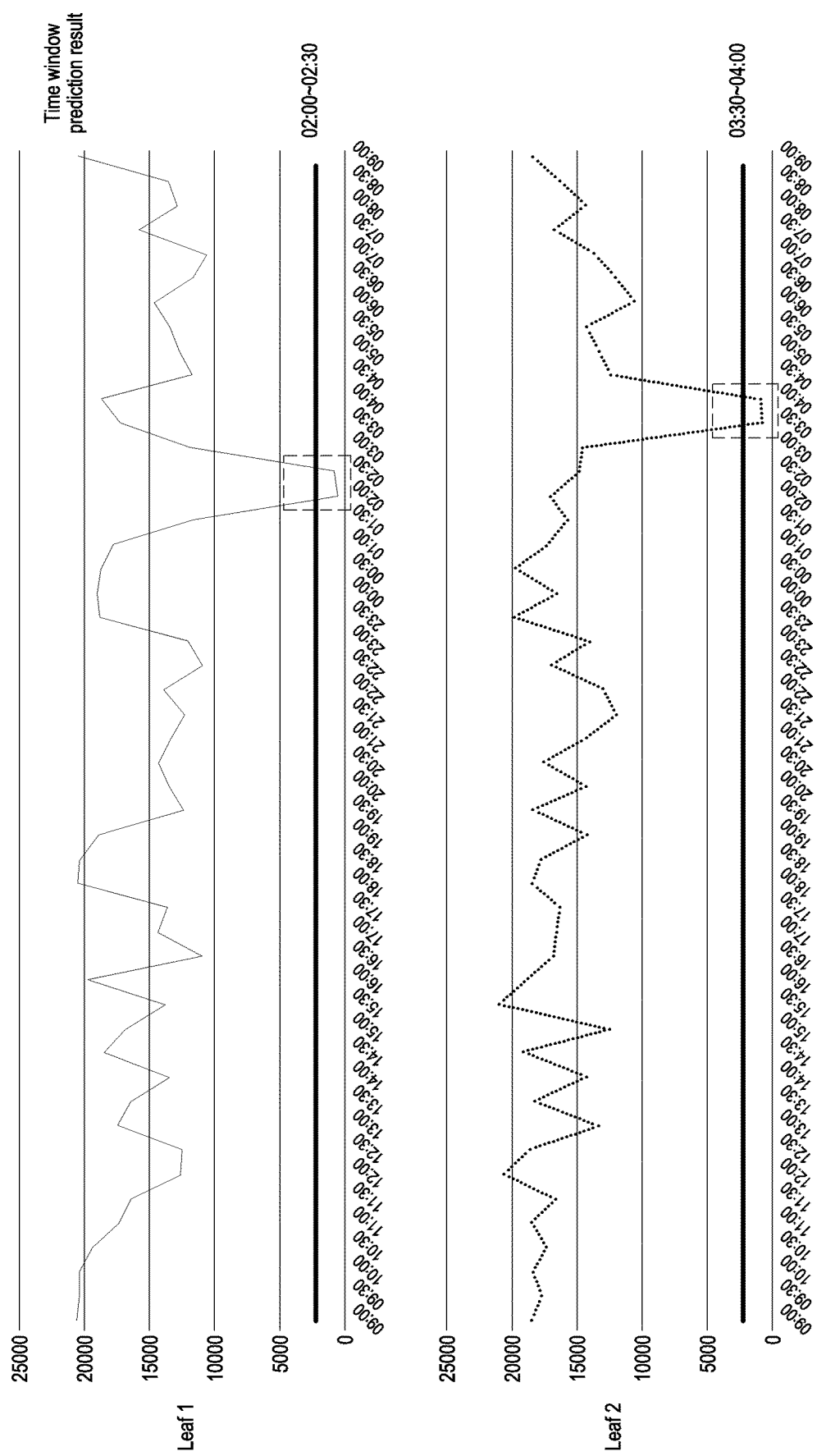

Referring to FIG. 9B, traffic at leaf 1 and leaf 2 is below 1 GB in next 24 hours. Hence, software upgrade for leaf 1 and leaf 2 cab be scheduled. FIG. 9C illustrates a graph representing predicted time period for software upgrade at access/leaf switch, using the methods of the disclosure.

Figure 9D:
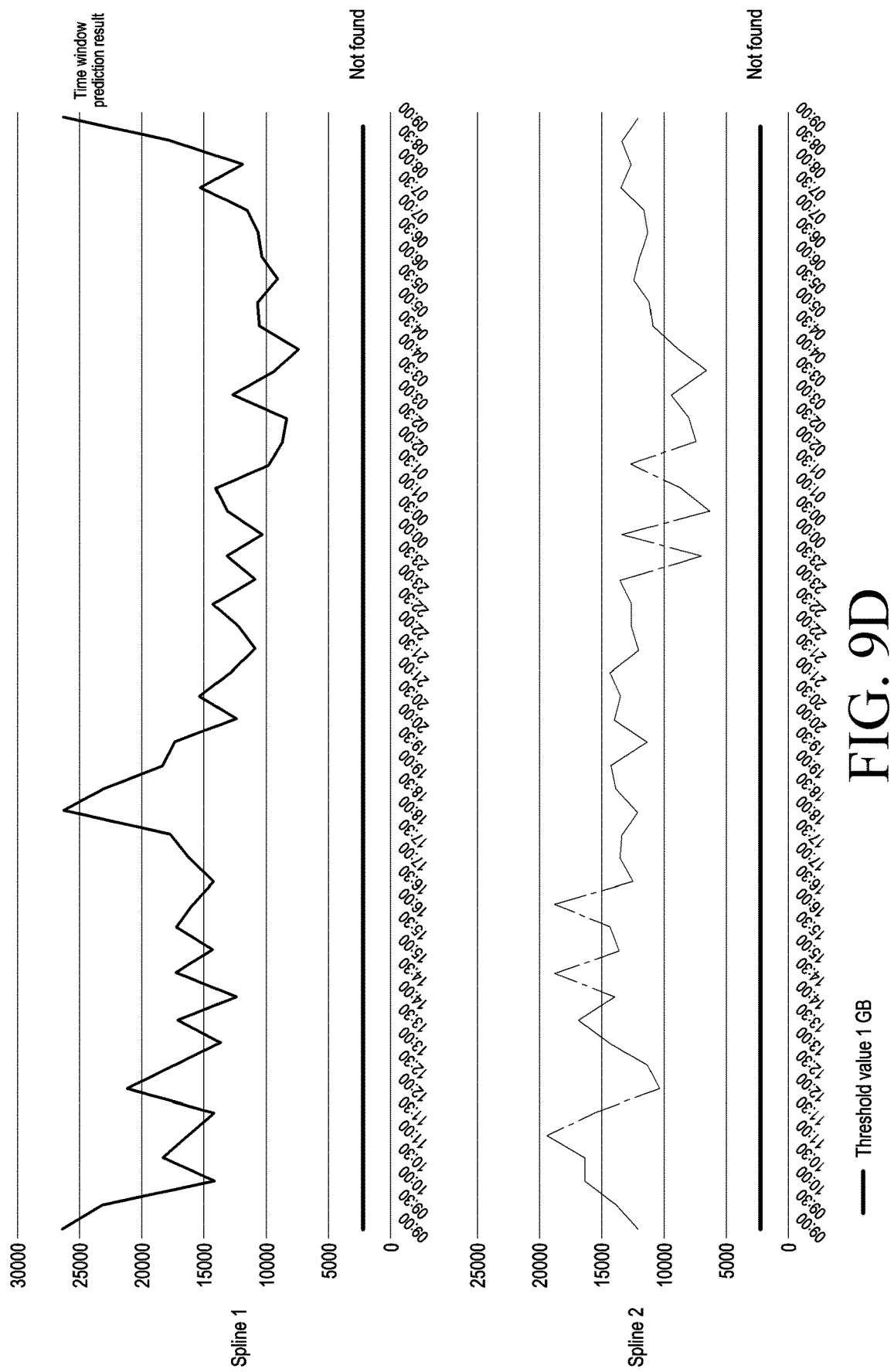

Referring to FIG. 9C, the time period for leaf 1 when traffic is below the first threshold, i.e., 5000 bits, is between 2.00 AM-2.30 AM. Similarly, the time period for leaf 2 when traffic is below the first threshold, i.e., 1 GB, is between 3.30 AM-4.00 AM. Accordingly, software upgrade for leaf 1 and leaf 2 can be scheduled in these periods. FIG. 9D illustrates a graph representing predicted time period for software upgrade at aggregation/spine switch, using the methods of the disclosure.

Figure 9E:
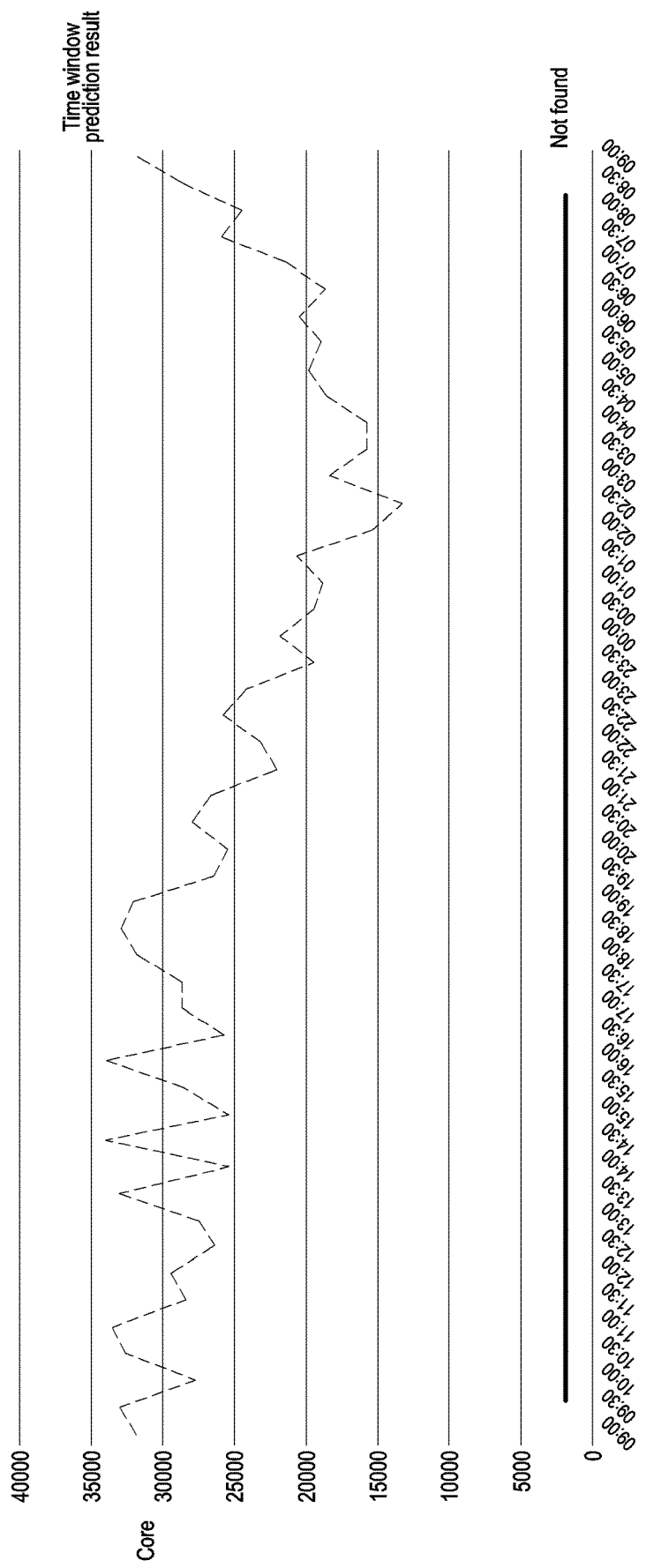

Referring to FIG. 9D, traffic is not below the first threshold, i.e., 1 GB, for spine 1 and spine 2 in next 24 hours. Accordingly, software upgrade for spine 1 and spine 2 cannot be scheduled in next 24 hours. FIG. 9E illustrates a graph representing predicted time period for software upgrade at core switch, using the methods of the disclosure.

Referring to FIG. 9E, traffic is not below the first threshold, i.e., 1 GB, for core in next 24 hours. Accordingly, software upgrade for spine 1 and spine 2 cannot be scheduled in next 24 hours. Hence, based on traffic predicted in FIGS. 9B to 9E, the following can be concluded:

TABLE 2

| Device | Predicted time period for software upgrade |
|---|---|
| Leaf1 | 02.00~2.30 AM |
| Leaf2 | 03.30~4.00 AM |
| Spine1 | Not Found |
| Spine2 | Not Found |
| core | Not Found |

Figure 10A:
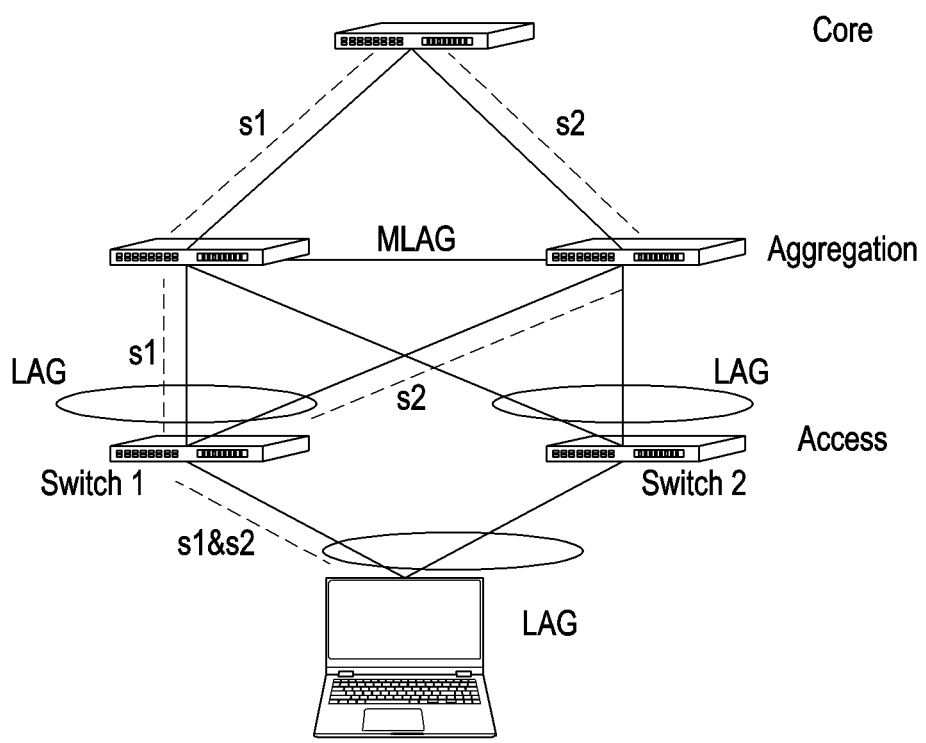
FIGS. 10A and 10B illustrate a network architecture implementing scheduling of software upgrade according to various embodiments of the disclosure.
Figure 10B:
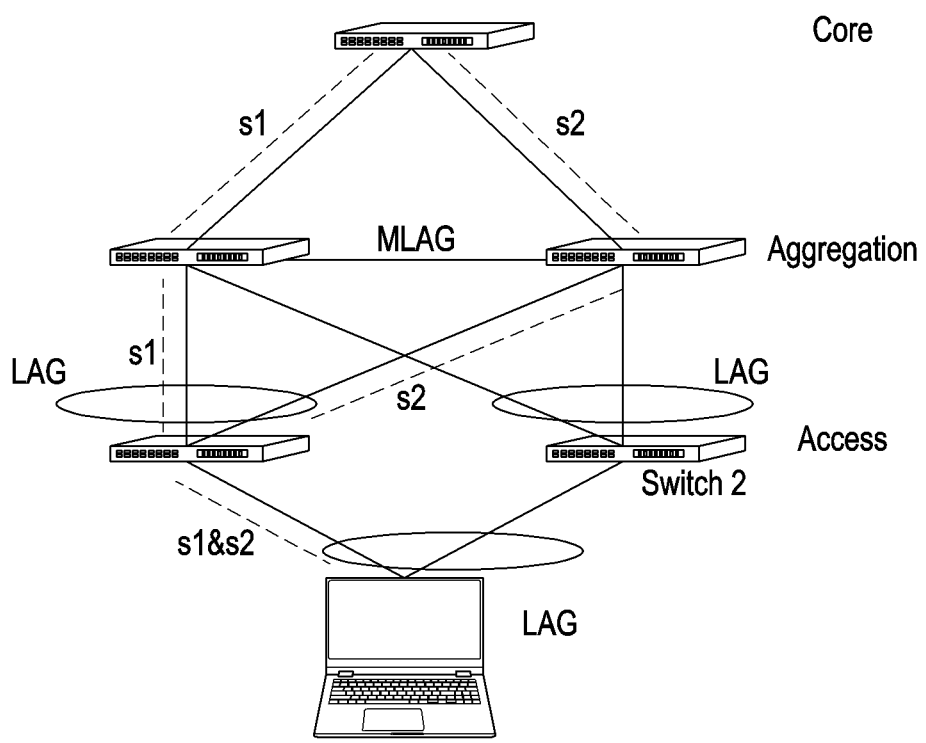

FIGS. 10A and 10B illustrate a network architecture implementing scheduling of software upgrade according to various embodiments of the disclosure.

Referring to FIGS. 10A and 10B, as multiple links connect from edge switch to distribution switches using link aggregation, if one switch fails, the traffic would continue to flow through the other switch. Link aggregation can do load balancing among the various switches in the link aggregation group. The traffic sessions are split evenly between the various switches which ensures its effective utilization. Each traffic session may have different rate of bandwidth flow session. For example, for first session, i.e., s1, the bandwidth may be 3 Gbps and for second session, i.e., s2, the bandwidth may be 5 Gbps bandwidth, if the total link capacity is 10 Gbps each.

If the traffic at the at least one SDN controlled network device, such as switch1, is above the first threshold in the time period, then switch1 traffic may be rerouted to a neighbor device, such as switch2. However, the traffic at switch2 should be below a second threshold. In an embodiment of the disclosure, the second threshold may be referred as capacity of switch2 to carry traffic of switch 1. Below is an example of rerouting the traffic from switch1 to switch 2.

In order to determine that traffic may be rerouted from switch1 to switch2, traffic loss may be calculated as follows:

Traffic rate=(S1+S2)/bandwidth capacity of switch2, where S1 is bandwidth capacity of switch 1 and S2 is bandwidth capacity of switch 2.

It is considered that there is no traffic loss if the traffic rate<=1. However, if the traffic rate>1, then it is considered as an extreme traffic loss situation. Further, it is considered that there is zero traffic loss, if switch2 has enough bandwidth to carry traffic of switch1, as shown in FIG. 9A.

For example, if
S1=3, S2=5, total capacity=10
Traffic rate=(3+5)/10=0.8=No loss

In this scenario, traffic from the switch1 may be rerouted to switch2 and software update may be scheduled in the time period at switch1.

However, if switch2 does not have enough traffic bandwidth to carry traffic of switch1, then there is huge traffic loss. For example, if
S1=10, s2=2, total capacity=10
Traffic rate=(10+2)/10=1.2=Extreme traffic loss When the predicted traffic at the least one SDN controlled network device is above the first threshold in the time period and traffic at the neighbor network device is below a second threshold, then a part of the traffic of the at least one of the SDN controlled network devices may be rerouted towards the neighbor SDN controlled network device. Thus, the software update at the network device may be scheduled in the determined time period. In an embodiment of the disclosure, below parameters may be used to determine if the neighbor SDN controlled network device, i.e., switch2 has capacity to carry traffic of the at least one SDN controlled network device, i.e., switch1:

TABLE 3

| No. | Parameter Name | Description |
|---|---|---|
| 1 | Router ID | Router ID from where flow details are getting collected |
| 2 | Timestamp | The time when this dataset was last sampled in Router ID |
| 3 | Throughput | Total bytes of incoming and outgoing packets belonging to this Router ID |
| 4 | Neighbor List | List of active Neighbors where (a) the traffic can be re-routed (b) traffic can be distributed { Nbr Router ID { Link ID Available bandwidth Used bandwidth Timestamp } Link[n] }Neighbor[n] |

For example, whenever the throughput value of the neighbor SDN controlled network device is below the second threshold, then it may be considered that the traffic is below the second threshold and software upgrade may be scheduled. The router ID may be used to identify the neighbor SDN controlled network device and the timestamp may be used to identify the time when the traffic was determined for the neighbor SDN controlled network device. Further, the Neighbor list may be identified based on router ID. The total bandwidth of the at least one SDN controlled network device and neighbor device should be less than capacity of the neighbor SDN controlled SDN device to schedule the software upgrade.

Figure 11A:
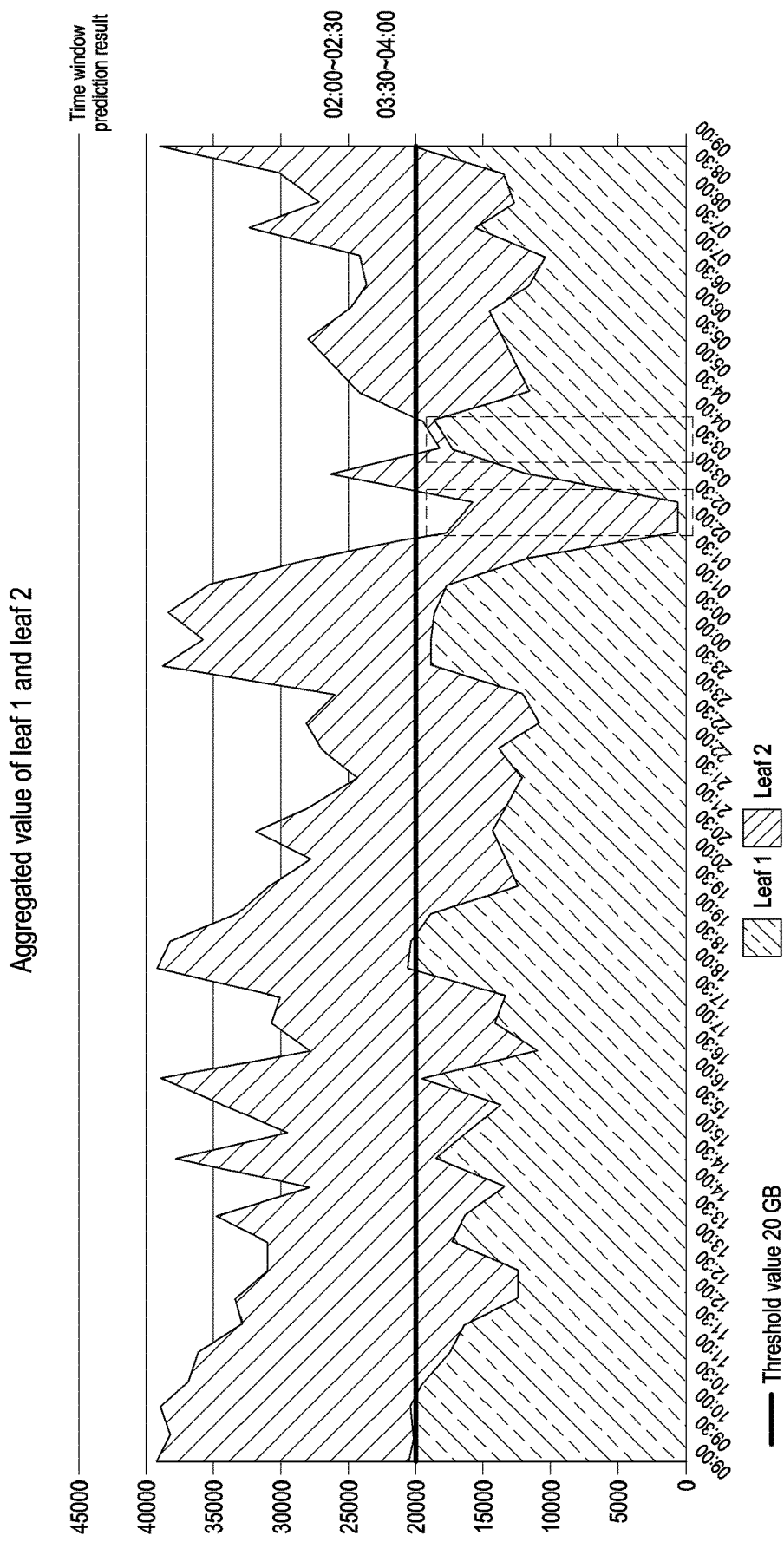
FIGS. 11A and 11B illustrate use case of scheduling software upgrade according to various embodiments of the disclosure.
Figure 11B:
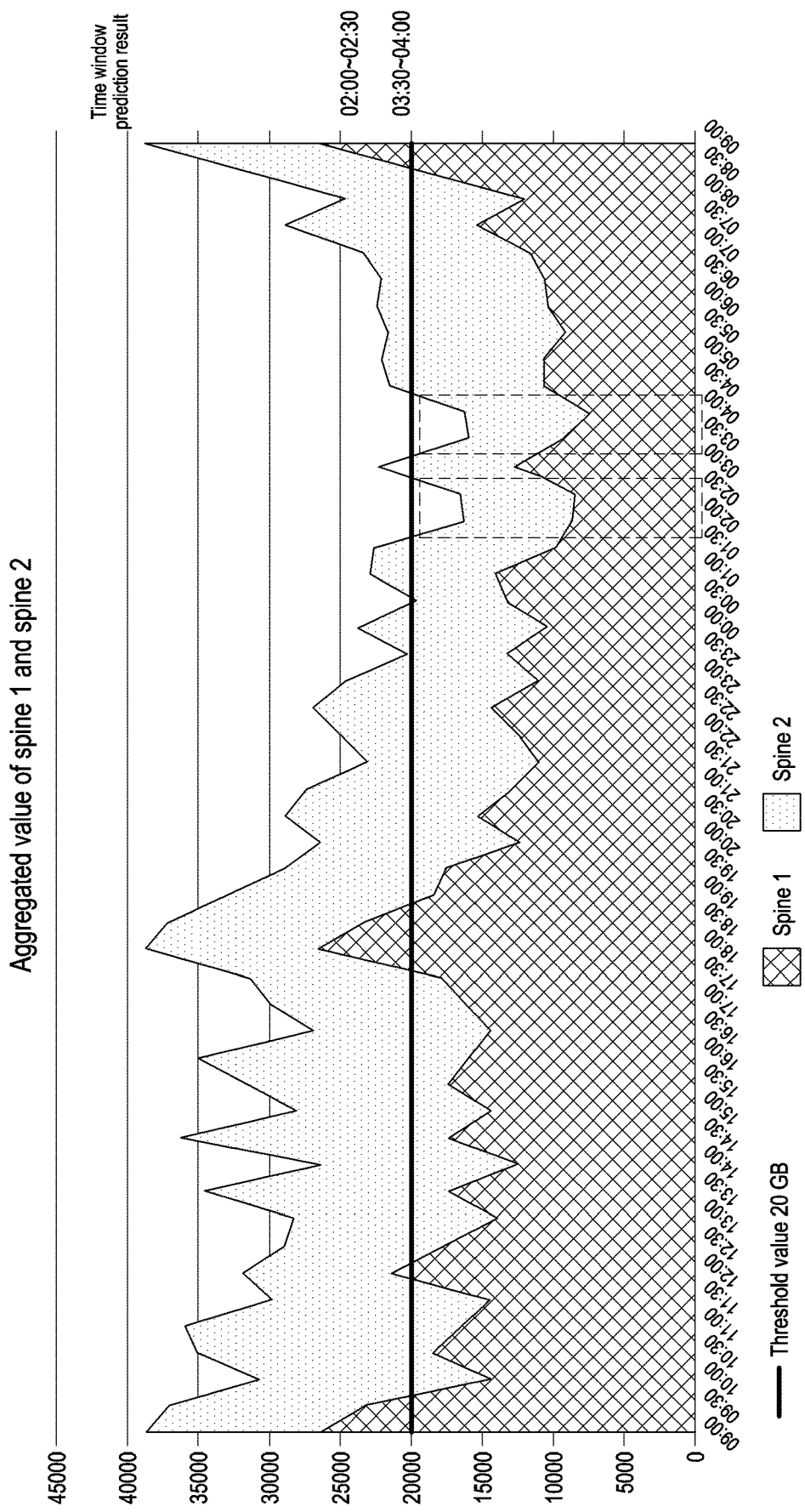

FIGS. 11A and 11B illustrate use case of scheduling software upgrade, according to various embodiments of the disclosure.

More particularly, FIGS. 11A and 11B represent traffic predicted of devices when the techniques of FIGS. 10A and 10B is applied on the campus data network of FIG. 9A. FIG. 11B illustrates a graph representing aggregated value of traffic at leaf 1 and leaf 2, using the methods of the disclosure. In an embodiment of the disclosure, the first threshold is considered as 1 GB and the second threshold is 20 GB.

Referring to FIG. 11A, time period where traffic for leaf 1 and leaf 2 is above 1 GB and below 20 GB is 2.00-2.30 AM and 3.30-4.00 AM, respectively. Similarly, referring to FIG. 11B, time period where traffic for spine 1 and spine 2 is above 1 GB and below 20 GB is 2.00-2.30 AM and 3.30-4.00 AM, respectively. Hence, based on traffic predicted in FIGS. 11A and 11B, the following can be concluded:

TABLE 4

| Device | Predicted time window for software upgrade |
|---|---|
| Leaf1 | 02.00~2.30 AM |
| Leaf2 | 03.30~4.00 AM |
| Spine1 | 02.00~2.30 AM |
| Spine2 | 03.30~4.00 AM |
| core | Not Found |

A network architecture implementing scheduling of software upgrade, in accordance with a third embodiment of the disclosure is the same as illustrated in FIG. 10B. It is possible that if no suitable time period for software upgrade can be found in accordance with techniques described in FIGS. 8, 10A, and 10B, then the network operator may accept minimum rate of low priority traffic loss during software upgrade. In other words, let us assume that the predicted traffic at the at least one SDN controlled network device is above the first threshold in the time period. Thereafter, if the traffic at the at least one SDN controlled network device is low priority traffic, the software upgrade may be scheduled in the time period. In an embodiment of the disclosure, acceptance low priority traffic loss value may be given by network administrator.

In an embodiment of the disclosure, calculate the traffic loss as follow:

Loss rate=Traffic rate−acceptance low priority traffic loss
Tolerate traffic loss, if loss rate<=0,
Extreme traffic loss, if loss rate>0
Traffic rate may be calculated in accordance with FIGS. 9A and 9B.
For example, if
S1=8, s2=6, total capacity=10, acceptance low priority traffic loss=1.5
Loss rate=((8+6)/10)−1.5=−0.1=Tolerate traffic loss Hence, traffic loss if tolerated if distribution switch2 have enough bandwidth to carry low priority traffic of switch, as shown in FIG. 10A.

However, if switch2 does not have enough traffic bandwidth to carry low priority traffic of switch1, then there is huge traffic loss, as shown in FIG. 10B.

For example, if
S1=10, s2=6, total capacity=10, acceptance low priority traffic loss=1.5
Loss rate=((10+6)/10)−1.5=0.1=Extreme traffic loss In an embodiment of the disclosure, below parameters may be used to determine if the network device has low priority traffic:

TABLE 5

| No. | Parameter Name | Description |
|---|---|---|
| 1 | Router ID | Router ID from where flow details are getting collected |
| 2 | Timestamp | The time by when this dataset was last sampled in Router ID |
| 3 | Throughput | Total bytes of incoming and outgoing packets belonging to this Router ID |
| 4 | Priority | Priority of the traffic flow |

For example, whenever the throughput value for the at least one SDN controlled device is above the first threshold, then it may be considered that the traffic is above the first threshold. In such scenario, in an embodiment of the disclosure, priority of traffic at the at least one SDN controlled device may be determined using a differentiated services field codepoints (DSCP) value and a protocol number followed by the traffic, in accordance with techniques known to a person skilled in the art. Table 6 below represents few examples of DSCP value corresponding to type of traffic:

TABLE 6

| DSCP Value | Traffic Category |
|---|---|
| 48-63 | Voice (VO) |
| 32-47 | Video (VI) |
| 24-31, 0-7 | Best effort (BE) |
| 8 to 23 | Background (BK) |

Further, the router ID of Table 5 may be used to identify the at least one SDN controlled device and the timestamp may be used to identify the time when the traffic was determined for the at least one SDN controlled device.

In another embodiment of the disclosure, Table 7 define few examples of high and low priority traffic:

TABLE 7

| Priority | Traffic |
|---|---|
| High Priority (>=Weightage 4) | 'CITRIX ™', 'CLOUDFLARE ™', 'CONTENT_FLASH', 'DNS', 'DROPBOX', 'HTTP', 'HTTP_CONNECT', 'HTTP_DOWNLOAD', 'HTTP_PROXY', 'IP_ICMP', 'MAIL_IMAPS', 'MICROSOFT ™', 'MQTT', 'MSN', 'MSSQL', 'MS_ONE_DRIVE', 'NTP', 'OFFICE_365 ™', 'OPENSIGNAL ™', 'SKYPE ™', 'SSL', 'SSL_NO_CERT', 'TEAMVIEWER ™', 'TOR ™' |
| Low Priority (<Weightage 4) | 'AMAZON ™', 'APPLE ™', 'APPLE_ICLOUD ™', 'APPLE_ITUNES ™', 'EASYTAXI ™', 'EBAY ™', 'FACEBOOK ™', 'FTP_DATA', 'GMAIL ™', 'GOOGLE ™', 'GOOGLE_MAPS ™', 'INSTAGRAM ™', 'SPOTIFY ™', 'TWITTER ™', 'UBUNTUONE ™', 'WHATSAPP ™', 'WIKIPEDIA ™', 'WINDOWS_UPDATE ™', 'YAHOO ™', 'YOUTUBE ™' |

Figure 12:
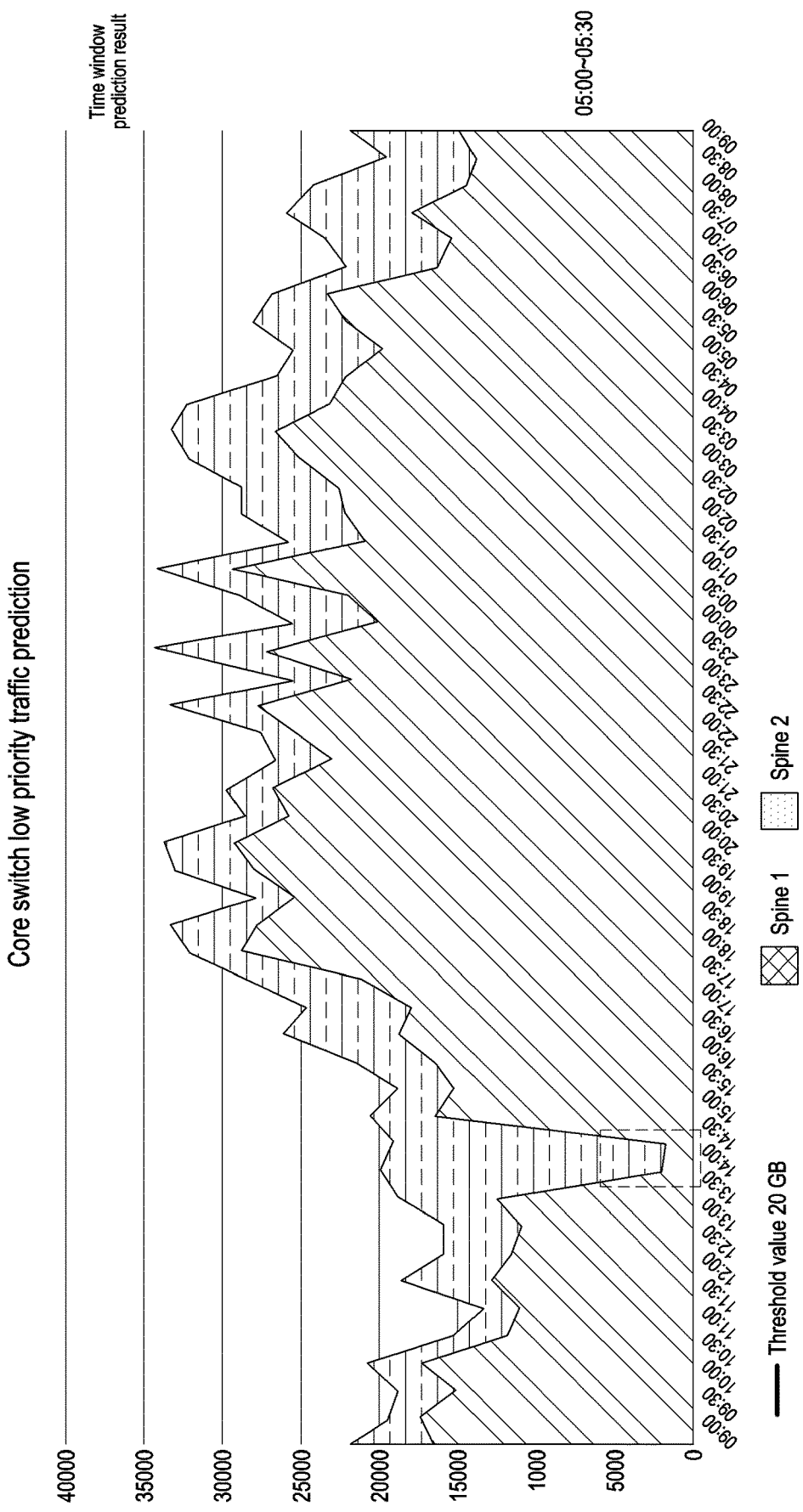
FIG. 12 illustrates use case of scheduling software upgrade according to an embodiment of the disclosure.

FIG. 12 illustrates a use case of scheduling software upgrade according to an embodiment of the disclosure.

More particularly, FIG. 12 illustrates a graph representing prediction of high percentage of low priority traffic at core switch, using the methods of the disclosure. Referring to FIG. 12, it can be seen that low priority traffic at the core switch is predicted between 05.00~5.30 AM. Accordingly, software upgrade may be scheduled between 05.00~5.30 AM.

In an embodiment of the disclosure, the low and high priority traffic may be defined by the network operator.

From Tables 1, 2 and traffic predicted in FIG. 12, following may be concluded:

TABLE 8

| Device | Predicted time period for Software upgrade |
|---|---|
| Leaf1 | 02.00~2.30 AM |
| Leaf2 | 03.30~4.00 AM |
| Spine1 | 02.00~2.30 AM |
| Spine2 | 03.30~4.00 AM |
| core | 05.00~5.30 AM |

In a further embodiment of the disclosure, the network devices may be divided into a plurality of batches. The division may be based on at least one of the traffic, the at least one event and vendor type. Thereafter, the software update may be scheduled for each of the plurality of batches in the time period.

In a further embodiment of the disclosure, the software upgrade may be validated post validation. More particularly, actual traffic and event at the at least one SDN controlled network device after performing the software upgrade, may be monitored. Thereafter, it may be compared with the predicted traffic and the at least one event. If result of the comparison is within a predetermined range, then it may be considered as a valid upgrade. However, if the result is not within the predetermined range, then it may be considered as an invalid upgrade. Thereafter, the software upgrade process is halted for the device with minimal impact by causing alternative path handover failure. It shall be noted that the predetermined range is configurable and may be configured by the network operator. An example of comparison is shown in below Table 9:

TABLE 9

| Event Type | Actual count | Predicted Count |
| --- | --- | --- |
| Link down | 4 | 3 |
| Link up | 4 | 4 |
| Bfd Session down | 2 | 2 |
| Bfd Session up | 2 | 2 |
| Authentication failure | 3 | 0 |
| Ospf interface state change | 2 | 1 |
| Ospf neighbor state change | 2 | 2 |

As shown in Table 9, the actual count of the event is close to the predicted count. Hence, the software upgrade is valid.

In an embodiment of the disclosure, following may be indicated to the network operator:

Devices that are selected as software upgrade;
Devices that became software upgrade candidate after failover traffic performed on alternate node;
Devices that are undergoing software upgrade; and
Devices that are scheduled in pipeline for software upgrade In a further embodiment of the disclosure, before scheduling the software update, pre-check of software validation may be performed. In an embodiment of the disclosure, pre-check of the software validation may be performed by upgrading firmware at staging network environment nodes. Thereafter, when the software is validated at the staging network environment, then software is validated at production environment. To validate the software, firstly, the current running version of firmware on which the software is running is compared with previous validated firmware. If the result of comparison is positive, then a list of nodes that are identified as upgrade candidate is generated.

In an embodiment of the disclosure, the processor 602 may be configured to predict traffic directed towards at least one of the SDN controlled network devices, predict at least one event to be occurred at the at least one of the SDN controlled network devices, determine a time period to schedule the software upgrade based on the predicted traffic and the at least one predicted event and schedule the software upgrade in the time period. In an embodiment of the disclosure, the system 600 may be configured to perform the method as discussed in respect to FIGS. 5, 7A, 7B, 8, 9A to 9E, 10A, 10B, 11A, 11B, and 12.

Hence, the disclosed techniques provide various advantages, such as:

Automation of software upgrade of devices without operator intervention thereby reducing operator overhead and improving quality of experience of operator.
Reducing data loss at the time of software upgrade.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown, nor do all of the acts necessarily need to be performed. In addition, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

We claim:

1. A method for scheduling software upgrade of network devices in an internet protocol (IP) based network, the method comprising:
   predicting traffic directed towards at least one of the network devices;
   determining at least one event to be occurred at the at least one of the network devices;
   determining a time period to schedule the software upgrade based on the predicted traffic and the determined at least one event; and
   scheduling the software upgrade in the time period.

2. The method of claim 1, wherein the scheduling of the software upgrade comprises one of:
   scheduling the software upgrade in the time period if the predicted traffic at the least one of the network devices is below a first threshold in the time period;
   rerouting a part of the traffic of the at least one of the network devices to at a neighbor network device and scheduling the software upgrade in the determined time period, if:
      the predicted traffic at the least one of the network devices is above the first threshold in the time period, and
      traffic at the neighbor network device is below a second threshold; or
   determining if the traffic at the at least one of the network devices is low priority traffic upon determining that the predicted traffic directed towards at the least one network device is above the first threshold in the time period and scheduling the software upgrade in the time period.

3. The method of claim 2, wherein the neighbor network device includes one of an access switch or an aggregation switch.

4. The method of claim 1, wherein the predicting of the traffic directed towards at least one of the network devices comprises:
   receiving traffic data from a traffic monitoring provider;
   parsing the traffic data to convert the traffic data in a common message format; and
   training a traffic learning engine based on the received traffic data to predict the traffic.

5. The method of claim 1, wherein the determining of the at least one event to be occurred at the at least one of the network devices comprises:
   receiving event data from an event monitoring provider;
   parsing the event data to covert in a common message format; and
   training an event learning engine based on the received event data to determine the at least one event.

6. The method of claim 1, wherein the at least one of the network device includes one of an access switch, an aggregation switch, or a core switch.

7. The method of claim 1, wherein the scheduling of the software upgrade comprises:
dividing the network devices into a plurality of batches based on at least one of the traffic, the at least one event, or vendor type; and
scheduling the software upgrade for each of the plurality of batches in the time period.

8. The method of claim 1, further comprising:
monitoring actual traffic and event at the at least one of the network device after performing the software upgrade;
comparing the actual traffic and event with the predicted traffic and the determined at least one event; and
determining if the software upgrade is valid based on the comparison.

9. The method of claim 1, further comprising:
prior to the predicting of the traffic directed towards the at least one of the network devices, performing validation of the network devices.

10. An electronic device for scheduling software upgrade of network devices in an internet protocol (IP) based network, the electronic device comprising:
a memory; and
at least one processor coupled to the memory, the at least one processor is configured to:
predict traffic directed towards at least one of the network devices,
determine at least one event to be occurred at the at least one of the network devices,
determine a time period to schedule the software upgrade based on the predicted traffic and the determined at least one event, and
schedule the software upgrade in the time period.

11. The electronic device of claim 10, wherein, for scheduling the software upgrade, the at least one processor is further configured to:
schedule the software upgrade in the time period if the predicted traffic at the least one of the network devices is below a first threshold in the time period,
reroute a part of the traffic of the at least one of the network devices to at a neighbor network device and scheduling the software upgrade in the determined time period, if:
the predicted traffic at the least one of the network devices is above the first threshold in the time period, and
traffic at the neighbor network device is below a second threshold, or
determine if the traffic at the at least one of the network devices is low priority traffic upon determining that the predicted traffic directed towards at the least one of the network devices is above the first threshold in the time period and scheduling the software upgrade in the time period.

12. The electronic device of claim 11, wherein, for scheduling the software upgrade, the at least one processor is further configured to:
divide the network devices into a plurality of batches based on at least one of the traffic, the at least one event, or vendor type, and
schedule the software upgrade for each of the plurality of batches in the time period.

13. The electronic device of claim 11,
wherein, when a throughput value for the at least one of the network devices is above the first threshold, the at least one processor is further configured to determine that the traffic is above the first threshold, and
wherein priority of traffic at the at least one of the network devices is determined using a differentiated services field codepoints (DSCP) value and a protocol number followed by the traffic.

14. The electronic device of claim 11,
wherein the at least one processor is further configured to determine, using parameters, if the neighbor network device has capacity to carry traffic of the at least one network device, and
wherein the parameters include at least one of a router ID, a timestamp, a throughput, or a neighbor list.

15. The electronic device of claim 10, wherein, for predicting the traffic directed towards at least one of the network devices, the at least one processor is further configured to:
receive traffic data from a traffic monitoring provider,
parse the traffic data to convert the traffic data in a common message format, and
train a traffic learning engine based on the received traffic data to predict the traffic.

16. The electronic device of claim 10, wherein, for determining the at least one event to be occurred at the at least one of the network devices, the at least one processor is further configured to:
receive event data from an event monitoring provider,
parse the event data to covert in a common message format, and
train an event learning engine based on the received event data to determine the at least one event,
wherein the event data includes at least one of failure events, threshold based traffic usage events, or route discovery protocols.

17. The electronic device of claim 10, wherein the at least one of the network devices includes one of an access switch, an aggregation switch, or a core switch.

18. The electronic device of claim 10, wherein the neighbor network device includes one of an access switch and an aggregation switch.

19. The electronic device of claim 10, wherein the at least one processor is further configured to:
monitor actual traffic and event at the at least one of the network devices after performing the software upgrade,
compare the actual traffic and event with the predicted traffic and the at least one event, and
determine if the software upgrade is valid based on the comparison.

20. The electronic device of claim 10, wherein, prior to the predicting of the traffic directed towards at least one of the network devices, the at least one processor is further configured to:
perform validation of the network devices.

* * * * *